United States Patent
Suzuki et al.

(10) Patent No.: US 10,288,117 B2
(45) Date of Patent: May 14, 2019

(54) MOTOR SYSTEM AND COMPRESSOR EQUIPPED THEREWITH

(71) Applicant: Hitachi, Ltd., Chiyoda-ku, Tokyo (JP)

(72) Inventors: Takahiro Suzuki, Tokyo (JP); Yasuaki Aoyama, Tokyo (JP); Shuhei Nagata, Tokyo (JP); Masaki Koyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/541,863

(22) PCT Filed: Jan. 7, 2015

(86) PCT No.: PCT/JP2015/050197
§ 371 (c)(1),
(2) Date: Jul. 6, 2017

(87) PCT Pub. No.: WO2016/110948
PCT Pub. Date: Jul. 14, 2016

(65) Prior Publication Data
US 2018/0003224 A1    Jan. 4, 2018

(51) Int. Cl.
*H02K 7/09* (2006.01)
*F04B 35/04* (2006.01)
(Continued)

(52) U.S. Cl.
CPC ............ *F16C 32/044* (2013.01); *F04B 35/04* (2013.01); *F04B 35/045* (2013.01); *H02K 7/09* (2013.01);
(Continued)

(58) Field of Classification Search
CPC ...................................... H02K 33/12
(Continued)

(56) References Cited

U.S. PATENT DOCUMENTS 6,495,996 B1    12/2002  Redlich
6,713,903 B2 *  3/2004   Widdowson ........ G03F 7/70758
                                                    310/12.32
(Continued)

FOREIGN PATENT DOCUMENTS

CN          1416213 A      5/2003
CN          102171915 A    8/2011
(Continued)

OTHER PUBLICATIONS

International Search Report (PCT/ISA/210) issued in PCT Application No. PCT/JP2015/050197 dated Mar. 24, 2015 with English translation (four pages).
(Continued)

*Primary Examiner* — David Luo
(74) *Attorney, Agent, or Firm* — Crowell & Moring LLP

(57) ABSTRACT

To provide a motor system that can control the position of a control object in multiple directions while suppressing the number of required switching elements. A motor system includes: a power conversion device including first, second, and third up-down arms each including two switching elements connected in series; a control object; and a first load including a magnetic pole tooth facing the control object, and a winding wound around the magnetic pole tooth. The motor system includes a second load including two magnetic pole teeth facing each other in a second direction with the control object therebetween, and a winding wound around one or both of the magnetic pole teeth. The power conversion device provides a force with respect to a first direction to the control object through an output to the first load, and provides a force with respect to the second direction to the control object through an output to the second load.

5 Claims, 18 Drawing Sheets

(51) Int. Cl.
  *F16C 32/04* (2006.01)
  *H02K 11/21* (2016.01)
  *H02K 11/33* (2016.01)
  *H02K 33/12* (2006.01)
  *H02K 41/03* (2006.01)
  *H02P 25/06* (2016.01)

(52) U.S. Cl.
  CPC ............ *H02K 11/21* (2016.01); *H02K 11/33* (2016.01); *H02K 33/12* (2013.01); *H02K 41/031* (2013.01); *H02P 25/06* (2013.01); *F16C 2380/26* (2013.01)

(58) Field of Classification Search
  USPC .......................................... 318/653, 652, 638
  See application file for complete search history.

(56) References Cited

U.S. PATENT DOCUMENTS

| | | | | |
|---|---|---|---|---|
| 7,453,229 | B2* | 11/2008 | Lee ........................ | F04B 35/045 318/443 |
| 9,163,621 | B2* | 10/2015 | Yoo ......................... | F04B 35/04 |
| 2011/0221282 | A1 | 9/2011 | Markon et al. | |
| 2011/0241449 | A1 | 10/2011 | Aoyama et al. | |
| 2013/0093264 | A1 | 4/2013 | Aoyama et al. | |
| 2013/0195677 | A1 | 8/2013 | Yoo et al. | |
| 2014/0292237 | A1 | 10/2014 | Yamazaki et al. | |

FOREIGN PATENT DOCUMENTS

| | | |
|---|---|---|
| CN | 102246401 A | 11/2011 |
| CN | 104079217 A | 10/2014 |
| JP | 5-236610 A | 9/1993 |
| JP | 8-145056 A | 6/1996 |
| JP | 2002-272174 A | 9/2002 |
| JP | 2009-303395 A | 12/2009 |
| WO | WO 2011/154995 A1 | 12/2011 |

OTHER PUBLICATIONS

Japanese-language Written Opinion (PCT/ISA/237) issued in PCT Application No. PCT/JP2015/050197 dated Mar. 24, 2015 (three pages).

Chinese-language Office Action issued in counterpart Chinese Application No. 201580064403.5 dated Nov. 26, 2018 (five pages).

* cited by examiner

UP (DOWN)

FRONT (REAR)

UP (DOWN)

FRONT (REAR)

UP (DOWN)

FRONT (REAR)

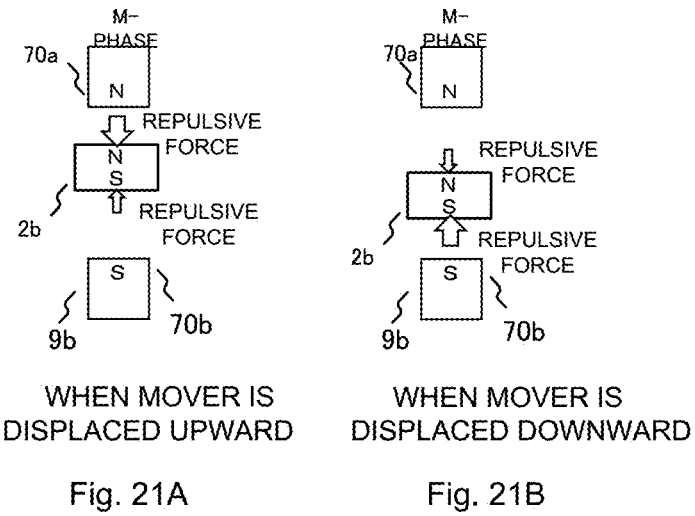
Fig. 21A — WHEN MOVER IS DISPLACED UPWARD
Fig. 21B — WHEN MOVER IS DISPLACED DOWNWARD
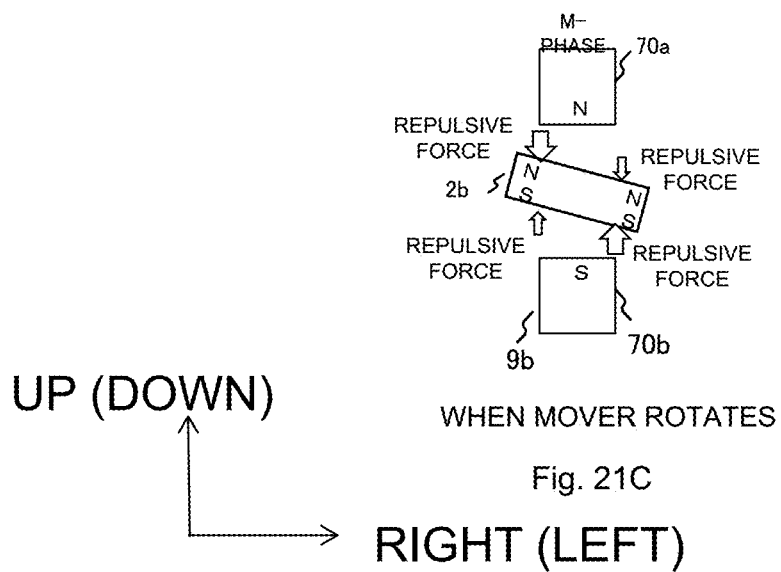
Fig. 21C — WHEN MOVER ROTATES

MOTOR SYSTEM AND COMPRESSOR EQUIPPED THEREWITH

TECHNICAL FIELD

The present invention relates to a motor system and a compressor.

BACKGROUND ART

PTL 1 describes a configuration to provide a current control device that can control a number of electromagnets with a small number of transistors. PTL 2 describes a linear motor.

CITATION LIST

Patent Literature

[PTL 1]: JP-A-8-145056
[PTL 2]: Domestic Re-publication of PCT Patent Application WO2011/154995

SUMMARY OF INVENTION

Technical Problem

PTL 1 relates to a magnetic bearing of a body of revolution, and line voltages $V_{U\text{-}N}$ and $V_{V\text{-}N}$ obtained from an inverter bridge 3 including six switching elements are respectively provided to two electromagnets 6 and 7 facing each other with a core 9, on a rotor side, therebetween (see FIGS. 1 and 2, etc.). That is, in PTL 1, different line voltages are applied to the two electromagnets 6 and 7 facing each other. Due to this, the position of the core 9 as a control object is controlled in one direction.

PTL 1 discloses to control the position of the core 9 in one direction, and it is necessary to provide two or more similar configurations in the case of controlling the position in two or more directions. A number of required switching elements leads to an increase in cost or an increase in the size of the device.

The two line voltage values $V_{U\text{-}N}$ and $V_{V\text{-}N}$ output to the electromagnets 6 and 7 disclosed in PTL 1 have the same characteristics such as the presence or absence of switching of polarities or the presence or absence of a frequency component as shown in FIGS. 5 and 6 or FIG. 7 of PTL 1, and PTL 1 does not disclose a method of using line voltage values having different characteristics.

PTL 2 discloses a plurality of magnetic poles that are disposed so as to interpose and hold magnets, disposed in a mover, therebetween, a winding wound around all of the plurality of magnetic poles, and the mover configured of a magnet row in which the polarities of the magnets are alternately arranged and a magnetic material (Abstract).

PTL 2 does not disclose a configuration to apply forces in two directions to the mover. Moreover, PTL 2 does not disclose a configuration to levitate the mover.

Solution to Problem

The invention has been made in view of the circumstances described above, and is directed to a motor system including: a power conversion device including first, second, and third up-down arms each including two switching elements connected in series; a control object; and a first load including a magnetic pole tooth facing the control object, and a winding wound around the magnetic pole tooth, wherein the motor system includes a second load including two magnetic pole teeth facing each other in a second direction with the control object therebetween, and a winding wound around one or both of the magnetic pole teeth, and the power conversion device provides a force with respect to a first direction to the control object through an output to the first load, and provides a force with respect to the second direction to the control object through an output to the second load.

Advantageous Effects of Invention

According to the invention, it is possible to provide a motor system that can control the position of a control object in multiple directions while suppressing the number of required switching elements.

Problems, configurations, and advantageous effects other than those described above will be apparent from the following description of embodiments.

BRIEF DESCRIPTION OF DRAWINGS

FIGS. 21A-21C Front schematic views of the magnetic levitation armature and the mover according to Embodiment 1.

DESCRIPTION OF EMBODIMENTS

Figure 1:
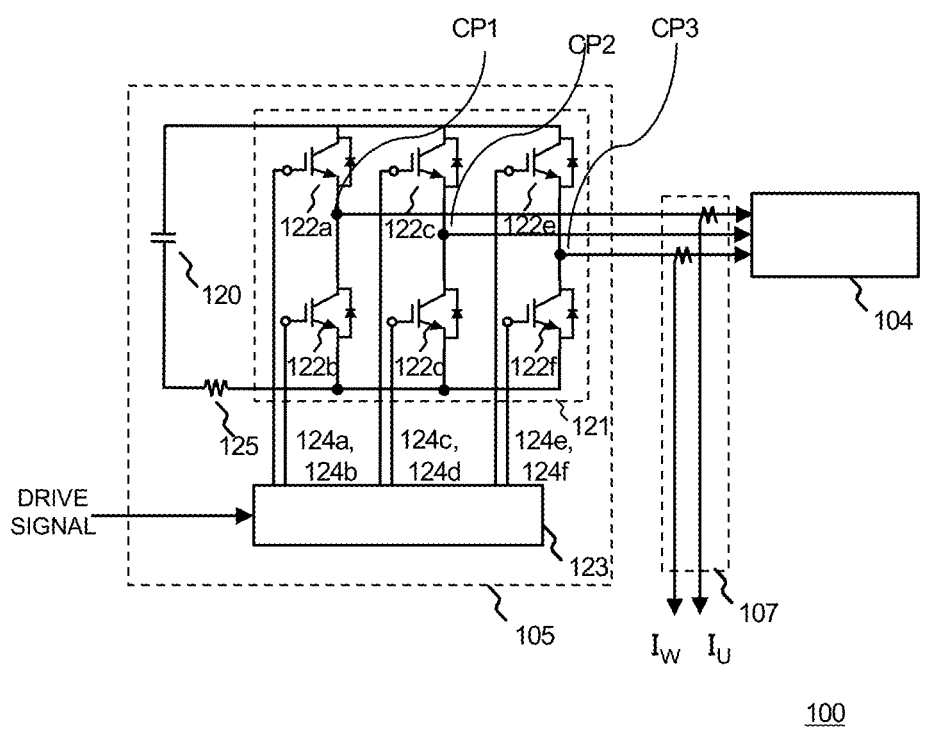
FIG. 1 A schematic view of a linear motor system according to Embodiment 1.

Hereinafter, embodiments of the invention will be described with reference to the attached drawings. Similar components are denoted by similar reference numerals and signs, and similar description is omitted. Moreover, the front-rear direction, the up-down direction, and the left-right direction may be referred to as a first direction, a second direction, and a third direction, respectively.

Embodiment 1

A linear motor system 100 as an example of a motor system includes a power conversion device 101 including a power conversion circuit 105, and a linear motor 104. For the power conversion device 101, a mover 6 of the linear motor 104 as an example of a motor is a control object. The linear motor 104 includes a drive armature 9a that provides thrust to the mover 6 and a levitation armature 9b that provides a magnetic levitation force thereto.

A first load in the embodiment is the drive armature 9a, and a second load 9b is the levitation armature 9b. Hereinafter, the first load and the second load are collectively referred to as loads, and the drive armature 9a and the levitation armature 9b are collectively referred to as armatures 9.

Linear Motor System 100

Power Conversion Circuit 105

FIG. 1 is a schematic view of the linear motor system 100 according to the embodiment. The flow of a current or the like that is output to the linear motor 104 via an inverter 121 is shown.

The power conversion circuit 105 includes the inverter 121, a DC voltage source 120, and a gate driver circuit 123. The inverter 121 includes six switching elements 122 (e.g., semiconductor switching elements such as IGBTs or MOSFETs). A freewheeling diode that causes power to flow back to the DC voltage source 120 is connected to each of the switching elements 122. Every two of the switching elements 122 are connected in series. The two switching elements 122 connected in series are referred to as an up-down arm.

A conductor that connects to any of the drive armature 9a and the levitation armature 9b of the linear motor 104 extends from each of connection points CP1 to CP3 to a conductor that connects the two switching elements. An input from the DC voltage source 120 is operated by controlling the switching (ON-OFF) of the up-down arm, so that a current or voltage output via the connection points CP1 to CP3 can be controlled. A current is applied to windings 8 of the linear motor 104 through the output from the power conversion circuit 105, so that the position of the mover 6 as a control object in two directions can be controlled.

Hereinafter, the up-down arms to which the connection points CP1 to CP3 belong, and the conductors connected to the connection points CP1 to CP3 or the currents or voltages that flow through the conductors are respectively referred to as a U-phase, a V-phase, and a W-phase.

The switching elements 122 perform switching operation in response to pulse-shaped drive signals (124a to 124f) output by the gate driver circuit 123 based on a three-phase AC voltage command value generated by a control unit 102 to be described later. In the following, the description will be made on the assumption that the output voltage value is commanded and controlled by the drive signal; however, controlling of an output current value can also be performed similarly.

In the case where a shunt resistor 125 is added to the DC side of the power conversion circuit 105, this case can be used for an overcurrent protection circuit for protecting the switching elements 122 when an excessive current flows, for a single-shunt current detecting method to be described later, and the like.

A current detection means 107 shown in FIG. 1 detects currents flowing into two phases of alternating currents of three phases flowing into the linear motor 104 or the power conversion circuit 105. The alternating currents of all phases may be detected; however, if two phases of the three phases can be detected, the other phase can be calculated from the detected two phases from the Kirchhoff's law.

Examples of another method for detecting an AC signal flowing into the linear motor 104 or the power conversion circuit 105 include, for example, the single-shunt current detection method to detect a current on the AC side of the power conversion circuit 105 from a direct current flowing into the shunt resistor 125 added to the DC side of the power conversion circuit 105. This method uses the fact that a current equivalent to an alternating current of each phase of the power conversion circuit 105 flows into the shunt resistor 125 depending on the conduction state of the switching element constituting the power conversion circuit 105. Since the current flowing into the shunt resistor 125 changes with time, it is necessary to detect the current at proper timing on the basis of the timing at which the drive signal 124 changes. Although not shown in the drawing, the single-shunt current detection method may be used for the current detection means 107.

Connection Relationship Between Power Conversion Circuit 105 and Armatures 9

Figure 2:
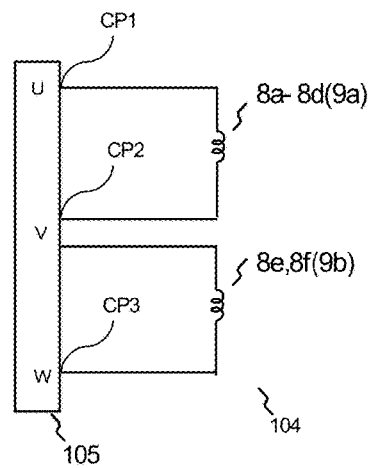
FIG. 2 A schematic view of the linear motor system according to Embodiment 1.

FIG. 2 is a schematic view of the linear motor system 100 according to the embodiment. The linear motor 104 includes the two armatures 9 (the drive armature 9a and the levitation armature 9b) connected to the power conversion circuit 105. Although one drive armature 9a and one levitation armature 9b are included in the embodiment, two or more drive armatures 9a and two or more levitation armatures 9b may be included. It is preferable that the levitation armature 9b is provided on each of the front side and the rear side with respect to the center of gravity of the mover 6.

The power conversion circuit 105 outputs a line voltage $V_{U-V}$ of the U-phase and the V-phase to the drive armature 9a, and outputs a line voltage $V_{V-W}$ of the V-phase and the W-phase to the levitation armature 9b. The drive armature 9a and the levitation armature 9b each have an inductance generated by a coil (the winding 8). The details of the structure of each of the armatures 9, the arrangement of the windings 8, and the like will be described later. The load 9 may be an inductance, a resistance, a capacitance, or a combination of them according to an apparatus (the linear motor 104 in the embodiment) connected to the power conversion circuit 105.

Figure 3:
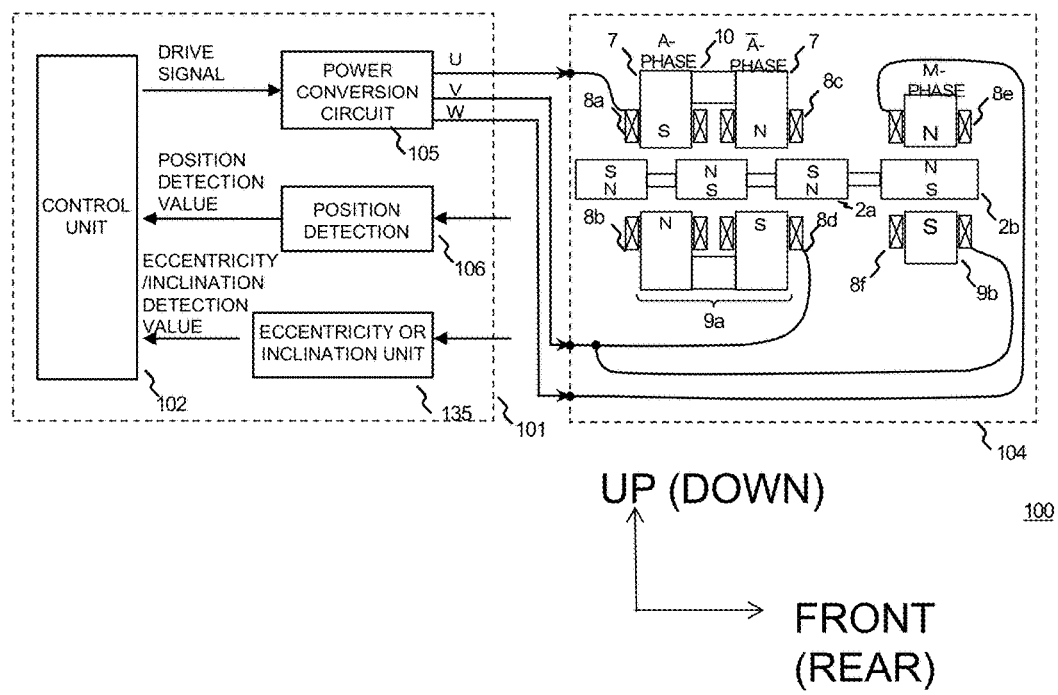
FIG. 3 A schematic view of the linear motor system according to Embodiment 1.

FIG. 3 is a schematic view of the linear motor system 100 according to the embodiment. The linear motor system 100 includes the power conversion device 101 and the linear motor 104.

The power conversion device 101 includes the control unit 102 outputting the output voltage command value of the power conversion circuit 105, the power conversion circuit 105, a position detection unit 106 that detects or estimates the position of the mover 6 in the front-rear direction, and an eccentricity/inclination detection unit 135 that detects or estimates the position (eccentricity) of the mover 6 in the up-down direction or the inclination thereof in the front-rear direction or the left-right direction.

Hereinafter, the direction of relative movement of the armature 9 and the mover 6 of the linear motor 104 is referred to as the "front-rear direction". The control unit 102 can obtain information of the reciprocating motion position or eccentricity/inclination of the mover 6 from the position detection unit 106 and the eccentricity/inclination detection unit 135. The up-down direction does not necessarily need to be parallel to the direction of gravitational force, and the front-rear direction, the left-right direction, or a direction other than those may be parallel to the direction of gravitational force.

The details of control performed by the control unit 102 will be described later. The power conversion circuit 105 according to the embodiment controls outputs to the drive armature 9a and the levitation armature 9b using the six switching elements 122. The drive armature 9a can control the position of the mover 6 in the front-rear direction, and the levitation armature can control the position of the mover 6 in the up-down direction.

The mover 6 receives, for example, a force (thrust) with respect to the front-rear direction through a sinusoidal alternating current applied to the drive armature 9a, and receives a force (magnetic levitation force) with respect to the up-down direction through a positive-negative variable direct current applied to the levitation armature 9b. The positive-negative variable direct current will be described later.

Outline of Structure of Linear Motor 104

As shown in FIG. 3, the armature 9 includes a magnetic pole 7 around which the winding 8 is wound. The magnetic pole 7 includes two magnetic pole teeth 70 (e.g., see FIG. 18) facing each other in the up-down direction with an air gap therebetween. The mover 6 is disposed in this air gap. Moreover, the magnetic pole teeth 70 facing each other do not necessarily need to completely overlap in top view, but may face each other with a slight shift in the front-rear direction or the left-right direction. The drive armature 9a includes two sets of magnetic pole teeth (i.e., four magnetic pole teeth), and the levitation armature 9b includes one set of magnetic pole teeth (i.e., two magnetic pole teeth). However, the drive armature 9a is not particularly limited as long as the drive armature 9a includes one or more magnetic pole teeth. Moreover, the levitation armature 9b is not particularly limited as long as the levitation armature 9b includes one or more sets of magnetic pole teeth.

The mover 6 is provided with a flat plate-shaped permanent magnet 2 magnetized in the up-down direction. The permanent magnet is not particularly limited as long as the permanent magnet includes one or more permanent magnets 2a and one or more permanent magnets 2b respectively capable of facing the magnetic pole tooth 70 of the drive armature 9a and the set of magnetic pole teeth of the levitation armature 9b. When a plurality of permanent magnets 2a facing the drive armature 9a are disposed, these are arranged such that the N-pole and the S-pole are alternated. Although the length of the permanent magnet 2a in the front-rear direction and the length of the permanent magnet 2b in the front-rear direction can be made equal, it is preferable that the permanent magnet 2b is longer. In doing so, it is possible to stably provide a magnetic levitation force to the mover 6 even when the movement length of the mover 6 in the front-rear direction is changed. The length of the magnetic pole tooth 70 of the levitation armature 9b in the front-rear direction may be longer than the length of the magnetic pole tooth 70 of the drive armature 9a in the front-rear direction.

Driving of Mover 6

Providing Thrust (Force in First Direction) to Mover 6 by Drive Armature 9a

Figure 4A:
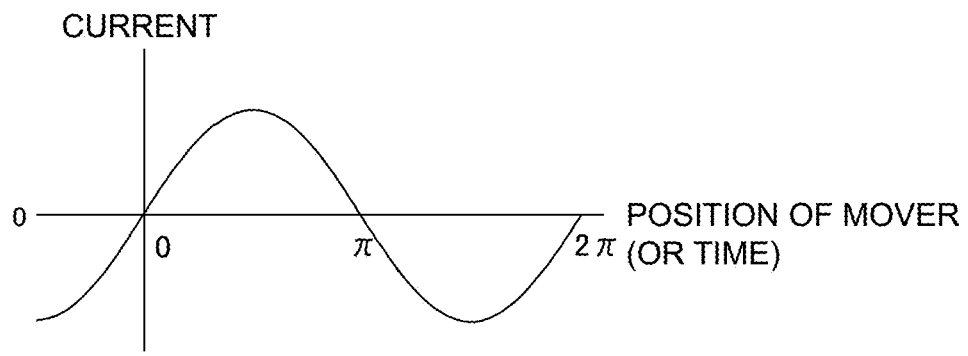
FIG. 4A A diagram showing the relationship between the position of a mover and a current waveform according to Embodiment 1.
Figure 4B:
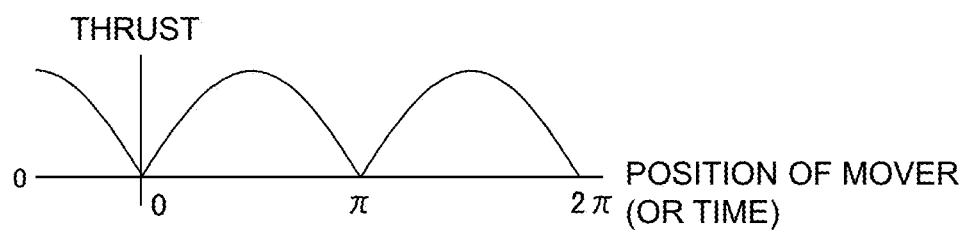
FIG. 4B A diagram showing the relationship between the position of the mover and thrust according to Embodiment 1.
Figure 5:
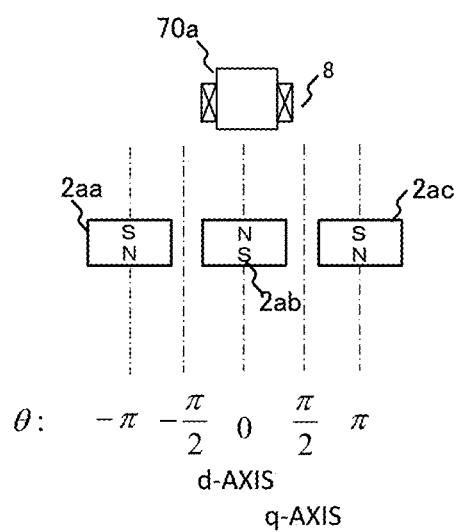
FIG. 5 A diagram showing the relationship between the phase of a current and the position of a permanent magnet, according to Embodiment 1.

FIG. 4 (a) is a diagram showing the relationship between the position of the mover 6 in the front-rear direction and a current waveform applied to the drive armature 9a, and FIG. 4(b) is a diagram showing thrust generated in the permanent magnet 2 of the mover 6 by the current waveform. The position of the mover 6 can be represented with, as shown in FIG. 5, 0 being the electrical angle at a position opposite a certain magnetic pole tooth 70a of the drive armature 9a serving as a reference, π being the amplitude length of reciprocating motion on one side, and −π being the amplitude length on the opposite side. The illustration of a magnetic pole tooth 70b facing the magnetic pole tooth 70a is omitted.

The position (phase) of the mover 6 in the front-rear direction is represented with 2π being one cycle of the electrical angle. Herein, the case where the center of the magnetic pole tooth 70a faces the center of the N-pole of a permanent magnet 2ab of the mover 6 when the phase is 0 while the center of the magnetic pole tooth faces the midpoint between the permanent magnet 2ab and a permanent magnet 2ac when the phase is π/2 will be described as an example.

The polarity of the permanent magnet facing the magnetic pole tooth 70a varies according to the phase of the mover 6. An alternating current (sinusoidal alternating current in the embodiment) according to this change in polarity is applied to the drive armature 9a, so that the mover 6 obtains thrust such as half-wave rectified one shown in FIG. 4(b). That is, the mover 6 obtains a force in the front-rear direction (first direction).

The linear motor 104 according to the embodiment is a synchronous motor, and the horizontal axes of FIG. 4 may be observed as time. In this case, FIG. 4 can be understood as diagrams of time change in the current waveform and the thrust.

A publicly known synchronous-motor technique can be applied to providing the thrust to the mover 6. Moreover, since the magnetization polarities of the upper-side magnetic pole tooth 70a and the lower-side magnetic pole tooth 70b of the armature 9 are configured so as to be opposite, the relationship between the lower-side magnetic pole tooth 70b and the permanent magnet 2 can be described similarly to FIGS. 4 and 5.

Providing Levitation Force (Force in Second Direction) by Levitation Armature 9b Providing a levitation force to the mover 6 will be described with reference to FIG. 3. The polarity of the permanent magnet 2b facing the levitation armature 9b is assumed to be N-pole in the upper direction (i.e., S-pole in the lower direction). In this case, an output current to the levitation armature 9b is controlled such that the upper-side magnetic pole tooth 70a of the levitation armature 9b is magnetized to the N-pole and that the lower-side magnetic pole tooth 70b is magnetized to the S-pole. That is, the output current is controlled such that the respective magnetization polarities of an upper-side magnetic pole tooth 70e and a lower-side magnetic pole tooth 70f of the levitation armature 9b are the same as the respective magnetization polarities of the upper side surface and lower side surface of the permanent magnet 2 facing the levitation armature 9b. Due to this, it is possible to provide the mover 6 with a potential that stabilizes the middle position in the up-down direction between the magnetic pole teeth 70e and 70f. That is, the mover 6 obtains a force in the up-down direction (second direction). Due to this, the mover 6 levitates in the air gap. The output current to the levitation armature 9b is kept constant (set to a constant current), so that the position of the mover 6 in the up-down direction can be stabilized in the state where an external force is not applied to the mover 6.

Here, when the mover 6 is inclined in the front-rear direction or the left-right direction due to disturbance, or is eccentric in the up-down direction, it becomes necessary to compensate for or control the position of the mover 6. For this reason, it becomes necessary to control the magnitude or polarity of the output current to the levitation armature 9b. That is, it is preferable that the output to the levitation armature 9b is an output signal that can be controlled in magnitude and polarity and is substantially composed of a DC component except for when the magnitude or polarity is changed. Hereinafter, such a signal is referred to as a "positive-negative variable DC signal". The positive-negative variable DC signal according to the embodiment is changed in magnitude or polarity in response to the occurrence of eccentricity or inclination of the mover 6.

Since the facing magnetic pole teeth 70 of the levitation armature 9b are located on the respective upper and lower sides of the permanent magnet 2b of the mover 6, the two magnetic pole teeth 70 of the levitation armature 9b can be magnetized by applying one line voltage $V_{V-W}$. Due to this, a levitation force can be provided to the mover 6. Although the permanent magnet facing the levitation armature 9b is the permanent magnet 2b in the embodiment, other permanent magnets 2 may be included.

Voltage Command Value to Provide Thrust and Magnetic Levitation Force

Figure 6:
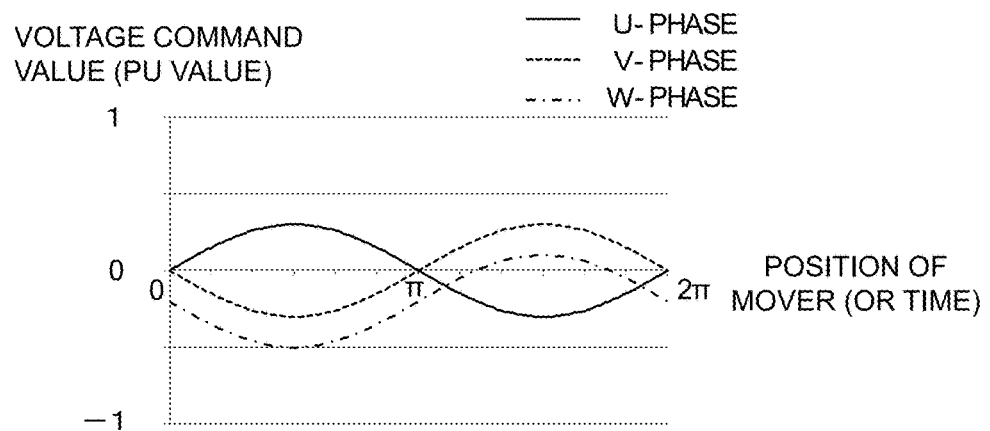
FIG. 6 A diagram showing the relationship between the position of the mover and voltage command values of respective phases, according to Embodiment 1.

FIG. 6 is a diagram showing the relationship among the voltage command values (drive signals) as an example of the signal command values to the respective phases (U-, V-, and W-phases) with respect to the position of the mover 6 in the front-rear direction. The voltage command value is a sinusoidal alternating current with a cycle of 2π for all of the phases, in which the U-phase and the V-phase have waveforms of opposite phases that are shifted in phase by π and the V-phase and the W-phase have waveforms of the same phase with an offset added thereto.

Figure 7:
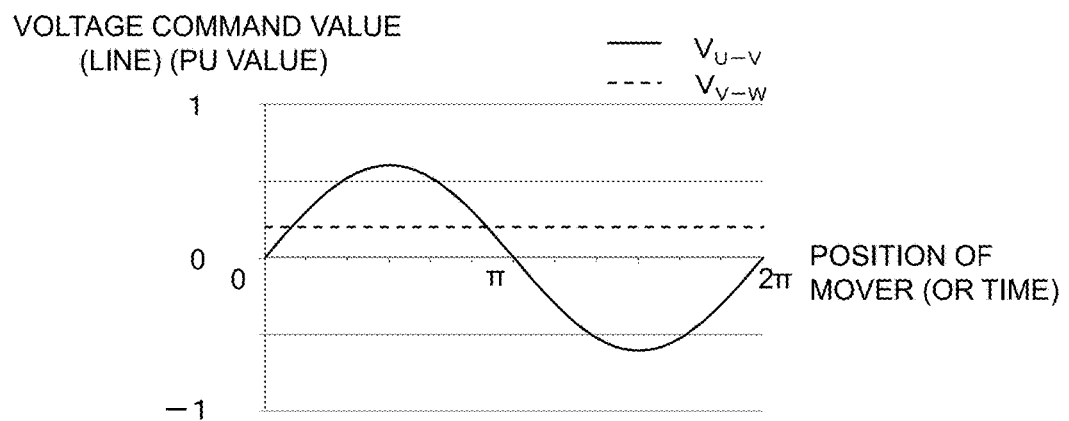
FIG. 7 A diagram showing the relationship between the position of the mover and line voltage command values of respective phases, according to Embodiment 1.

FIG. 7 is a diagram showing two line voltages (the voltage difference $V_{U-V}$ between the U-phase and the V-phase and the voltage difference $V_{V-W}$ between the V-phase and the W-phase) obtained from the voltage command values. The line voltages are respectively applied to the drive armature 9a and the levitation armature 9b.

The line voltages described above are obtained by setting the connection relationship with the respective phases and the drive signals to the respective phases are set so as to obtain the voltage command values described above, so that it a sinusoidal AC voltage and a positive-negative DC voltage can be respectively provided to the two loads using the power conversion circuit 105 including the six switching elements 122. Due to this, the position of the mover 6 as a control object in two directions (the front-rear direction and the left-right direction or the up-down direction) can be controlled. Hereinafter, the control of the position will be described in detail. In the embodiment, the case where the mover 6 is controlled in the front-rear direction and the up-down direction will be described.

For convenience of description, in the following, the line voltage $V_{U-V}$ may be referred to as a first line voltage, $V_{V-W}$ may be referred to as a second line voltage, and the U-, V-, and W-phases may be respectively referred to as first, second, and third phases.

In the embodiment, the voltage command values of the three phases are set as follows. The command values of the first and second phases of the three phases are set to be opposite in phase to each other. The third phase is set to a command value obtained by adding an offset to either the first or second phase. Herein, the case where the third phase is set to a command value obtained by adding an offset to the second phase will be described.

The first line voltage of the first phase and the second phase is provided to the drive armature 9a as the first load. The second line voltage of the second phase and the third phase different from the second phase by the offset is provided to the levitation armature 9b as the second load.

By doing this, the position of the mover 6 in the front-rear direction can be controlled by applying the sinusoidal alternating current to the drive armature 9a as the first load. Moreover, the position of the mover 6 in the up-down direction can be stabilized by applying a current to the levitation armature 9b as the second load. Although the details of the principle of stabilization of the position in the up-down direction will be described later, the eccentricity (position in the up-down direction) or inclination of the mover 6 can be compensated for or controlled because the output of current to the second load is controlled by switching the on and off of the switching elements 122 and thus can be controlled as the positive-negative variable direct current. That is, the control of the position of the mover 6 in the front-rear direction and the position thereof in the up-down direction can be independently controlled.

It does not matter at all if the vertical axis of FIG. 6 is deemed as the on/off ratio (duty ratio) of the drive signal.

Although a harmonic component may be mixed into the line voltage according to the embodiment because the voltage is formed using the switching elements, the line voltage can be made close to the voltage command value by passing through a low-pass filter. For example, the first line voltage $V_{U-V}$ can be obtained as a sinusoidal AC voltage, and the second line voltage $V_{V-W}$ can be obtained as a constant voltage or positive-negative variable DC voltage. Moreover, a rectangular-wave alternating current may be applied through the first line voltage. Moreover, the current applied through the second line voltage may be a constant current. Also in this case, since the force that the permanent magnet of the mover 6 receives becomes larger as the permanent magnet approaches the magnetic pole tooth 70, the eccentricity or inclination of the mover 6 in the up-down direction can be compensated for.

Change in Voltage Command Value when Controlling Position of Mover 6 in Front-Rear Direction Next, the voltage command value when the position of the mover 6 in the front-rear direction is controlled will be described using FIG. 8 and FIG. 9. In FIGS. 8 and 9, the horizontal axis represents time; however, since a publicly known synchronous-motor technique can be applied to providing thrust to the mover as described above, FIGS. 8 and 9 can be considered similarly to the case where the horizontal axis represents the phase as described in FIGS. 6 and 7. For example, when the thrust (torque in the case of a rotary motor) of the linear motor 104 is to be increased at a time point of 5 ms, the amplitude of the sinusoidal AC voltage of the first line voltage is increased by increasing a thrust command value input to a voltage amplitude generator 131 to be described later and thus a current flowing into the drive armature 9a is increased. Moreover, for example, when the speed (rotational speed in the case of a rotary motor) of the thrust of the linear motor 104 is to be increased at a time point of 10 ms, the frequency of the sinusoidal AC voltage of the first line voltage is increased by increasing a change in position command value input to the voltage amplitude generator 131 to be described later.

Figure 8:
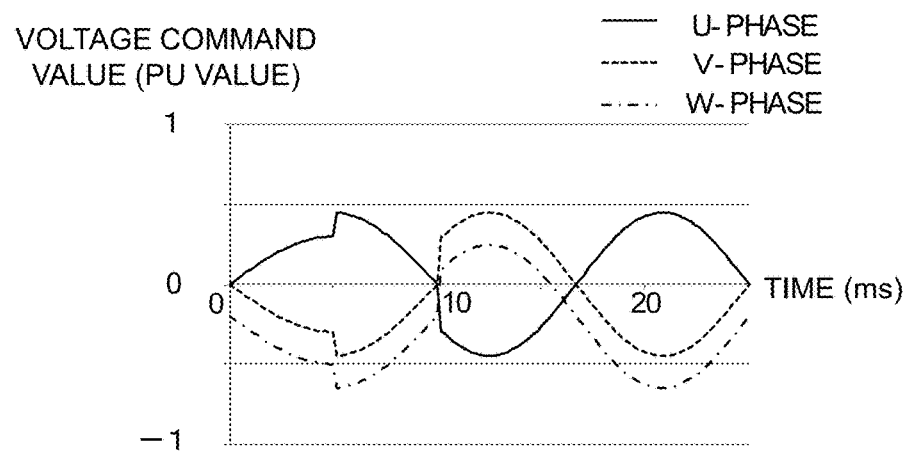
FIG. 8 A diagram showing the voltage command value when the position of the mover in the front-rear direction is controlled, according to Embodiment 1.
Figure 9:
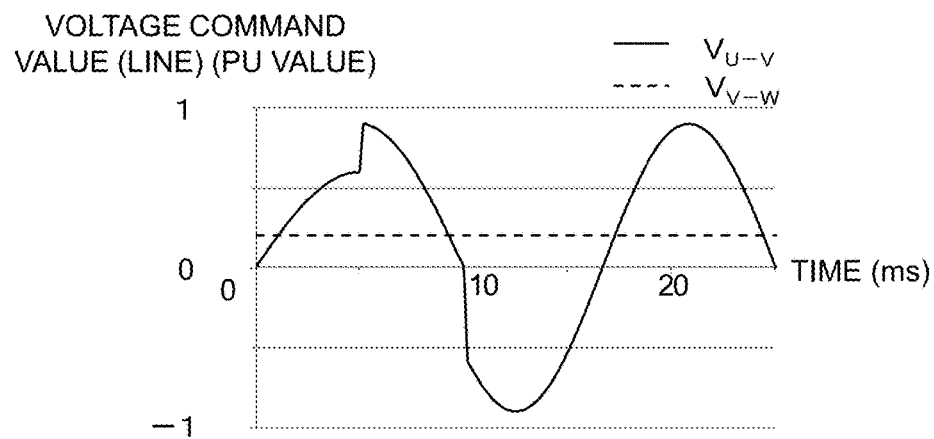
FIG. 9 A diagram showing line voltages when the position of the mover in the front-rear direction is controlled, according to Embodiment 1.

FIG. 9 is a diagram showing the first line voltage and the second line voltage in the example of FIG. 8. Since FIG. 8 and FIG. 9 show an example in which a magnetic levitation force is constant, the first line voltage changes depending on the thrust and speed but the second line voltage is constant.

Figure 10:
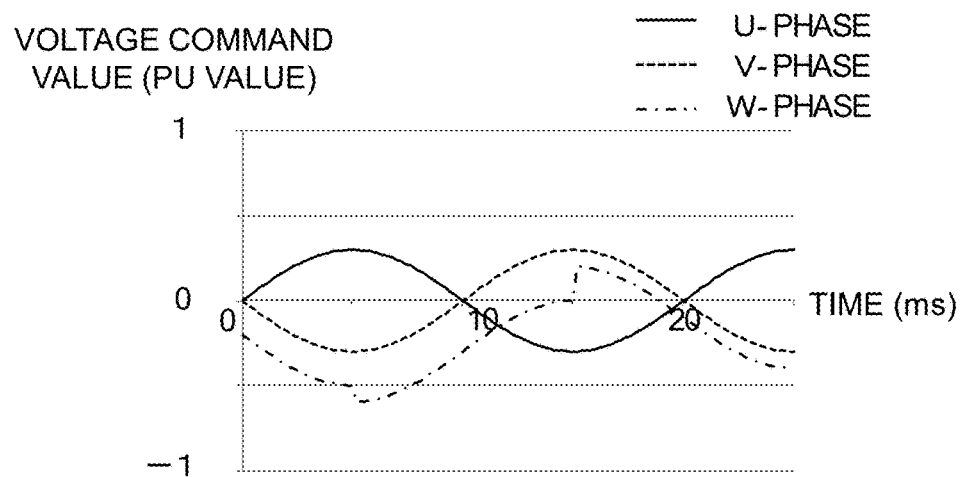
FIG. 10 A diagram showing voltage command values when the position of the mover in the up-down direction is controlled, according to Embodiment 1.
Figure 11:
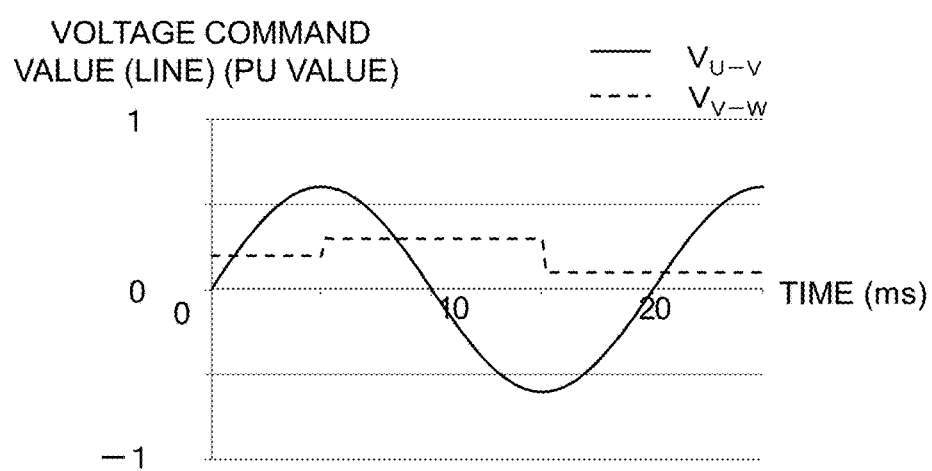
FIG. 11 A diagram showing line voltages when the position of the mover in the up-down direction is controlled, according to Embodiment 1.

Change in Voltage Command Value when Controlling Position of Mover 6 in Up-Down Direction On the other hand, the voltage command value when the position of the mover 6 in the up-down direction is controlled will be described using FIG. 10 and FIG. 11. Although a specific control configuration example will be described later, a difference between the command value and detection value of eccentricity or inclination can be subjected to proportional-integral control for providing a levitation force to the mover 6. For example, when the mover 6 is shifted from the center by an external force applied thereto at a time point of 5 ms, the positive-negative variable DC voltage of the second line voltage is increased to increase the current flowing into the levitation armature 9b. Due to this, the levitation force can be increased, and the mover 6 can be returned to the middle position in the up-down direction between the magnetic pole teeth 70e and 70f. Moreover, for example, since the position of the mover 6 is settled at the middle position in the up-down direction between the magnetic pole teeth 70e and 70f at a time point of 15 ms, the positive-negative DC voltage of the second line voltage is reduced. When the mover 6 is inclined, the mover 6 can be controlled by similarly controlling the voltage command value.

When a force applied to the mover 6 does not change much, the second line voltage may be set constant. Considering the reduction of useless power, however, it is desirable to employ a control configuration in which a current is changed as necessary using a proportional integration controller.

Voltage Command Value Considering Amount of Heat Generation of Switching Element 122

In the description of FIG. 8 to FIG. 11, the description has focused on the fact that the control of the position of the mover 6 in the front-rear direction and the position thereof in the up-down direction are independently controlled; actually, however, both types of control are simultaneously performed in many cases. This is because, when the thrust or speed of the linear motor 104 is increased, a reactive force that the mover 6 receives also increases according to the increased thrust or speed. Conversely, when a necessary levitation force is increased, the thrust or speed is also increased because the load of the linear motor 104 increases in many cases.

Figure 12:
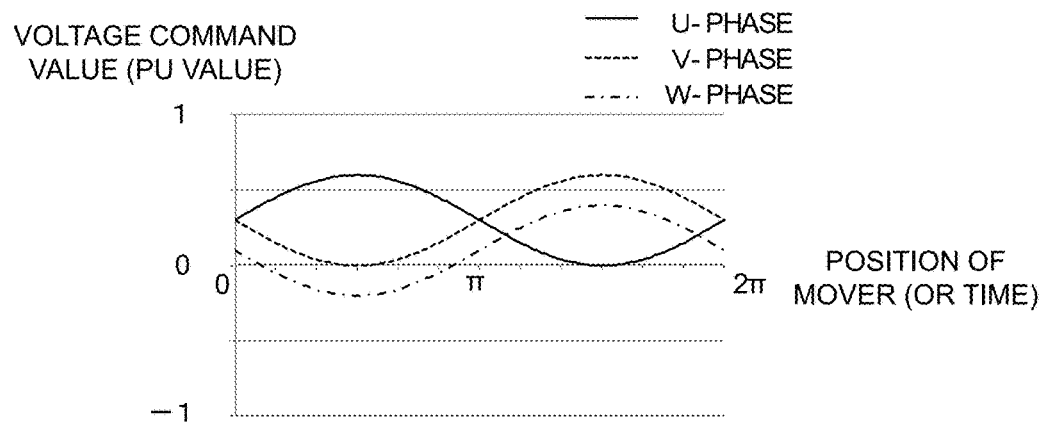
FIG. 12 A diagram showing another example of voltage command values according to Embodiment 1.

Although the case where the waveform is a symmetrical sine wave with respect to the phase of the first line voltage or time being at zero has been shown in the above, the waveform can be a symmetrical sine wave with respect to that being at other than zero as shown in FIG. 12. The duty of FIG. 6 or FIG. 12 can be seen as the ON ratio of an IGBT and a diode of the switching element 122. The thermal resistances of the IGBT and the diode are usually the same; however, there may be a difference between the thermal resistances of the IGBT and the diode depending on the configuration of the inverter 121. In this case, the effect of reducing the amount of heat generation is provided by increasing the ratio at which the IGBT or the diode whichever has a smaller thermal resistance is turned on. FIG. 12 shows an example in which the IGBT has a smaller thermal resistance. Although the first line voltage and the second line voltage do not change because the voltage command values of all of the phases are offset, the ratio at which the IGBT is turned on can be increased and thus the amount of heat generation of the inverter 121 can be reduced.

Adjustment Considering Upper and Lower Limits of Voltage Command Value

Figure 13:
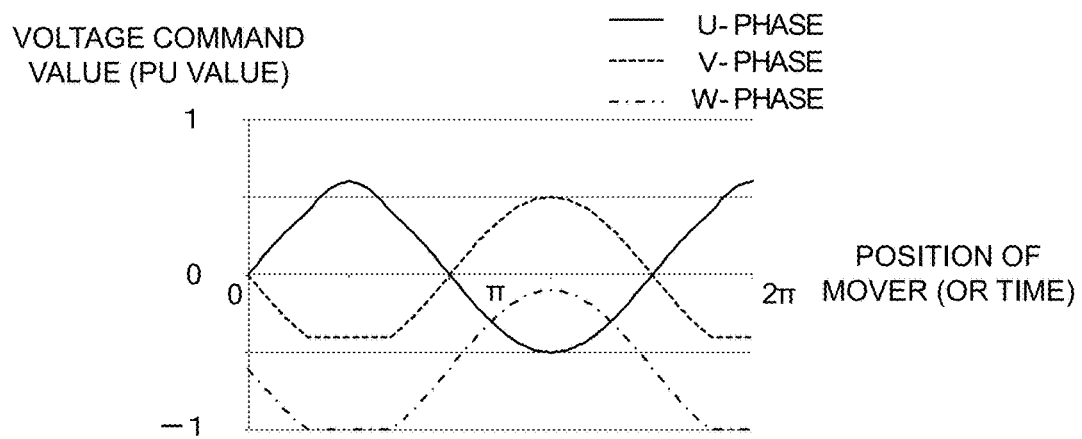
FIG. 13 A diagram showing voltage command values when the voltage command value of the W-phase reaches the upper and lower limits, according to Embodiment 1.
Figure 14:
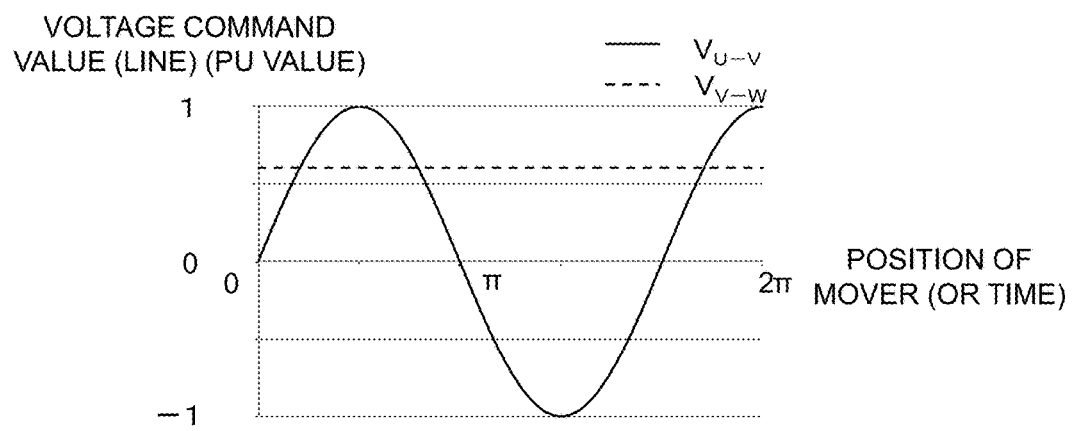
FIG. 14 A diagram showing line voltages when the voltage command value of the W-phase reaches the upper and lower limits, according to Embodiment 1.

Since the voltage command values that are not a balanced three-phase sinusoidal voltage are output in the embodiment, only the voltage command value of any of the phases may exceed 1 depending on conditions. It is also possible to set the drive range to this region, but there is still room to maximize the conversion efficiency of the power conversion circuit. As shown in FIG. 13, therefore, when the voltage command value of a certain phase (the W-phase in the example of FIG. 13) exceeds ±1, the exceeded amount is offset to the other two phases and thus the operating range can be expanded. In the case of FIG. 13, since the W-phase, which should take the voltage command value of the sine wave, cannot be at a voltage command value of less than −1, the waveform is partially flat. For this reason, the voltage command value of the V-phase is similarly made flat in order to avoid the influence on the second line voltage $V_{V\_W}$. For this reason, further, an offset is added to the voltage command value of the U-phase in order to avoid the influence on the first line voltage $V_{U\_V}$.

Generation of Voltage Command Value

Control Unit 102

First, the definition of coordinate axes will be described. In the embodiment, a permanent magnet synchronous linear motor including the permanent magnet 2 in the mover 6 is used; therefore, the description is made on the assumption that the position of a control axis that is detected, estimated, or assumed in the power conversion device 101 and the actual position of the mover 6 are basically synchronized. Actually, however, a shift (axis error) may occur between the position of the control axis and the position of the mover in a transient state such as during acceleration or deceleration or during load fluctuations. When the axis error occurs, the thrust actually produced by the linear motor 104 may be reduced or distortion or overshoot may occur in the current flowing into the linear motor 104.

In processing in the power conversion device 101, position information of the linear motor 104 is used. In FIG. 5, d-q axes composed of a d-axis that represents the position of the permanent magnet 2 of the mover 6 in the main magnetic flux direction and a q-axis that electrically advances in the positive direction (the right direction on the paper surface) by 90 degrees (electrical angle 90 degrees) from the d-axis are defined. The d-q axes constitute a moving coordinate system fixed on the mover 6.

Figure 15:
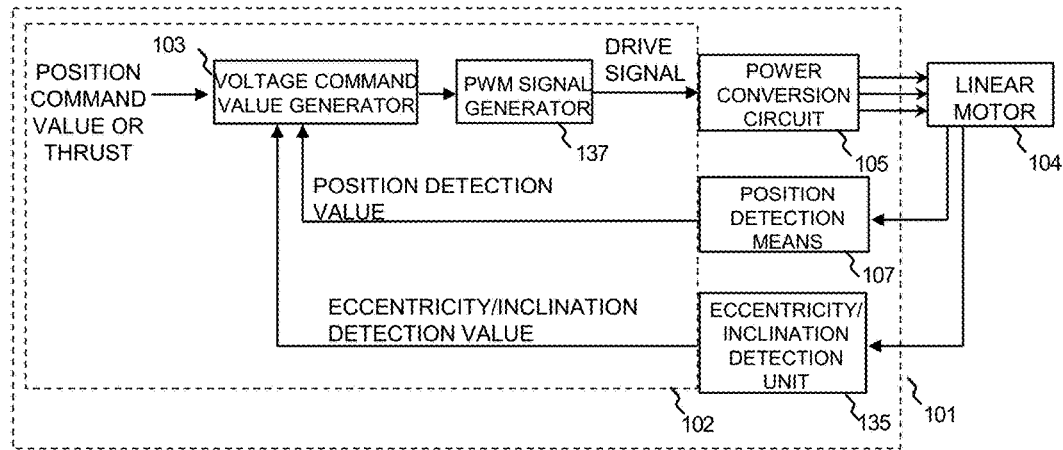
FIG. 15 A diagram showing the configuration of a control unit and an input/output relationship according to Embodiment 1.

FIG. 15 is a diagram showing the configuration of the control unit 102 and an input/output relationship according to the embodiment. A position detection value through the position detection unit 106 and the value of eccentricity or inclination through the eccentricity/inclination detection unit 135 are input to a voltage command value generator 103 of the control unit 102.

Voltage Command Value Generator 103

Figure 16:
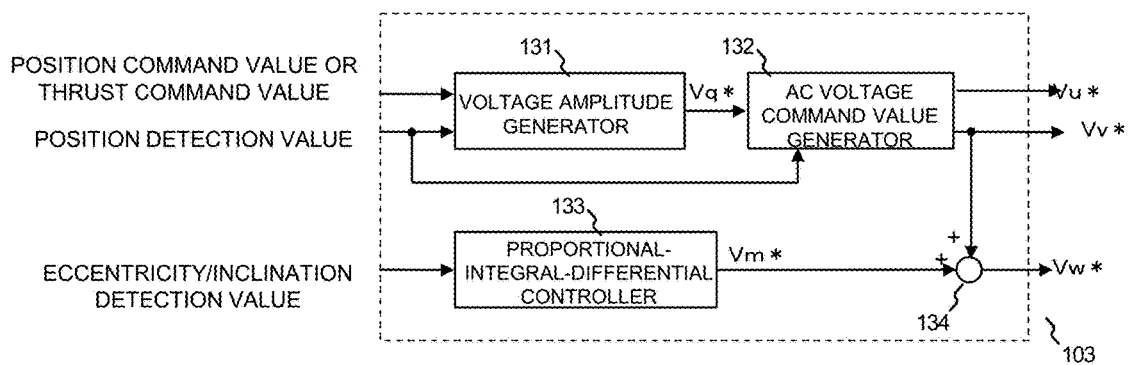
FIG. 16 A diagram showing the configuration of a voltage command value generator according to Embodiment 1.

FIG. 16 is a diagram showing the configuration of the voltage command value generator 103. The position command or thrust command value and the position detection value are input to the voltage amplitude generator 131. The voltage amplitude generator 131 adjusts a q-axis voltage command value Vq* using, for example, proportional integration control so that the position detection value coincides with the position command or thrust command value.

An AC voltage command value generator 132 receives the q-axis voltage command value and the position information and outputs sinusoidal voltage command values (Vu* and Vv*) of two phases that are shifted in phase by π according to the position θd of the mover as in Equation (1) and Equation (2).

[Math. 1]

$$Vu^* = Vq^* \times \sin \theta d \qquad (1)$$

[Math. 2]

$$Vv^* = Vq^* \times \sin(\theta d + \pi) \qquad (2)$$

A proportional-integral-differential controller 133 receives the value of eccentricity or inclination through the eccentricity/inclination detection unit 135 and outputs a magnetic levitation voltage command value Vm* using PID control so that the value of eccentricity or inclination becomes 0. The magnetic levitation voltage command value Vm* is added to Vv by an adder 134 and is output as Vw*. The magnetic levitation voltage command value Vm* may be a negative value depending on the result of PID control.

By configuring the control unit 102 as described above, the mover 6 can be controlled to a desired position or by thrust, and at the same time, the eccentricity or inclination of the mover 6 can be controlled to 0. By setting the position command value of the mover 6 to a position other than the middle position in the up-down direction between the magnetic pole teeth 70e and 70f, the mover 6 can also be controlled to any eccentric position.

Although the configuration in which the line voltage command value is controlled to have a sinusoidal shape has been described, the line voltage command value may have a square-wave (pulse) shape.

By doing as described above, the positive-negative variable DC voltage and the AC sinusoidal voltage or the like to be respectively output to the two loads can be independently controlled.

Details of Constituent Member of Linear Motor 104

Structure of Armature 9

The configuration of the drive armature 9a will be described using FIG. 17 to FIG. 21. The levitation armature 9b can be made similar to the structure of the drive armature 9a located on one side from a bridge 10 in the front-rear direction, and therefore, the levitation armature 9b can be described similarly to the description of the drive armature 9a.

Figure 17:
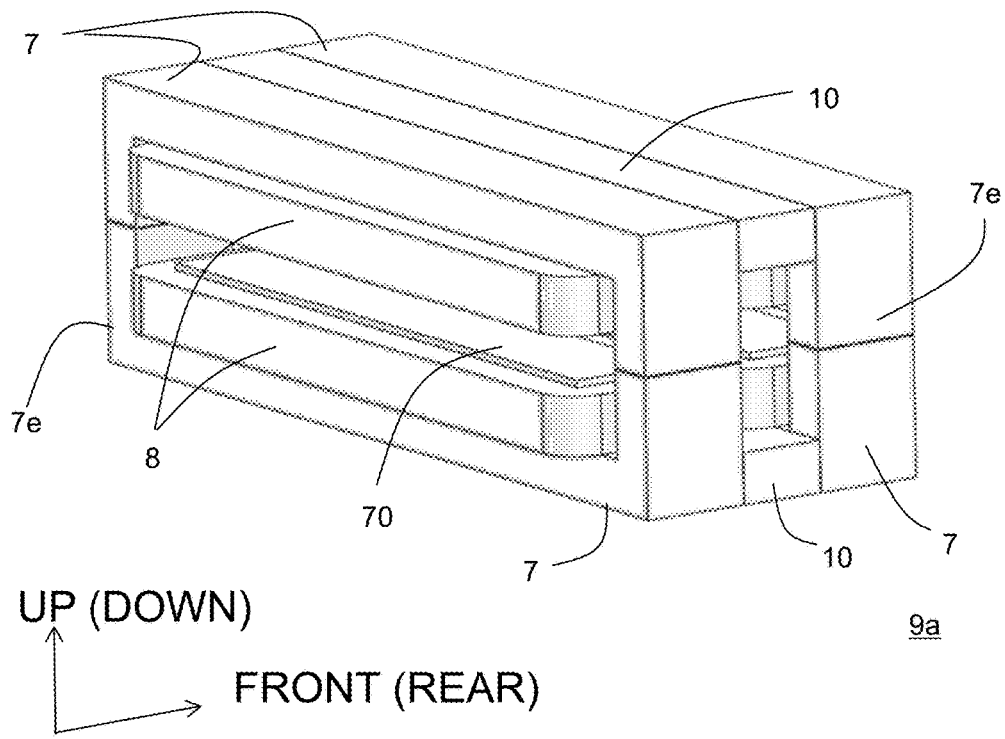
FIG. 17 A perspective view of a drive armature according to Embodiment 1.
Figure 18:
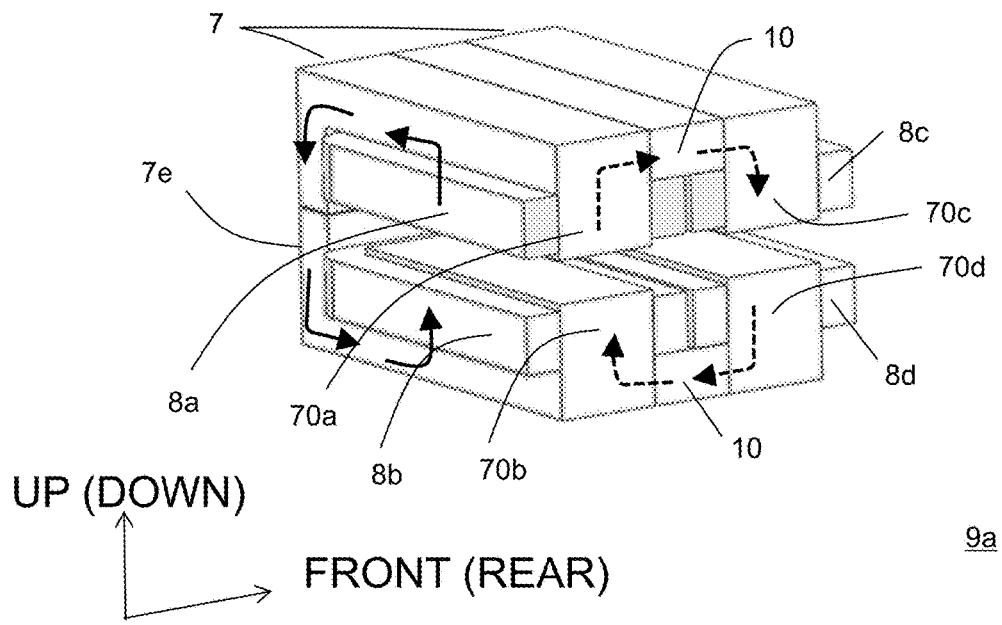
FIG. 18 A side cross-sectional perspective view of the drive armature according to Embodiment 1.

FIG. 17 is a perspective view of the drive armature 9a according to Embodiment 1. FIG. 18 is a side cross-sectional perspective view of the drive armature 9a according to Embodiment 1.

The drive armature 9a includes a total of four magnetic poles 7 every two of which are disposed in the up-down direction and the front-rear direction, and the bridge 10 inserted between the magnetic poles 7 arranged in the front-rear direction. The interval of the magnetic poles 7 in the front-rear direction can be defined by the thickness of the bridge 10.

Two facing magnetic poles 7 are connected in the up-down direction with a core 7e. The magnetic pole 7 includes the magnetic pole tooth 70, whereby two magnetic pole teeth 70 face each other in the up-down direction with an air gap therebetween. The winding 8 is wound around each of the magnetic pole teeth 70, and magnetism occurs in the magnetic pole tooth 70 with a current flowing into the winding 8.

The windings 8 wound around the magnetic pole teeth 70 are adjusted in connection or winding direction such that the polarities of the magnetic pole teeth 70 facing each other or adjacent to each other are different and that the polarities of the magnetic pole teeth 70 diagonally opposite to each other are the same. For example, with reference to FIGS. 3 and 18, when the upper-rear-side magnetic pole tooth 70a is the S-pole, the lower-rear-side magnetic pole tooth 70b facing the magnetic pole tooth 70a and the upper-front-side magnetic pole tooth 70c adjacent thereto are magnetized to the N-pole and the lower-front-side magnetic pole tooth 70d diagonally opposite thereto is magnetized to the S-pole. By magnetizing the magnetic pole teeth as described above, a magnetic flux loop (the solid line arrows in FIG. 18) is formed on the plane parallel to the up-down direction and the left-right direction in the drive armature 9a. Moreover, when the bridge 10 is a magnetic substance, a magnetic flux loop (the broken line arrows in FIG. 18) is also formed on the plane parallel to the up-down direction and the front-rear direction. Similarly, a magnetic flux loop is formed on the plane parallel to the up-down direction and the left-right direction in the levitation armature 9b.

Connection Relationship of Winding 8

An upper-side winding 8a and a lower-side winding 8b that face each other in the up-down direction in the drive armature 9a are connected; an upper-side winding 8c and a lower-side winding 8d that face each other in the up-down direction in the drive armature 9a are connected; and an upper-side winding 8e and a lower-side winding 8f that face each other in the up-down direction in the levitation armature 9b are connected. That is, when a current is applied to either the winding 8a, 8c, or 8e, or 8b, 8d, or 8f, the current also flows into the other.

It is sufficient that the windings 8 included in the armature 9 respectively magnetize the sets of magnetic pole teeth. For this reason, each set of magnetic pole teeth may include only one of the upper-side winding and the lower-side winding. In the case where the winding 8 is wound around each of the two magnetic pole teeth 70 belonging to the set of magnetic pole teeth as in the embodiment, this case is preferable because larger magnetic flux can be supplied. When a configuration that supports each of the front side and rear side of the mover 6 with respect to the center of gravity is provided, the drive armature 9a may include a magnetic pole tooth only on either the upper side or lower side of the mover 6. For the configuration supporting the mover 6, an axial support by the levitation armature 9b or other axial support structures can be adopted. As the other axial support structures, in the case of manufacturing, for example, a compressor equipped with the linear motor 104, a piston connected to the mover 6 and a cylinder on which the piston slides can be adopted.

Output to Levitation Armature 9b

In the levitation armature 9b, since the two windings 8e and 8f facing each other in the up-down direction of the mover 6 are connected, the two windings 8e and 8f are included in the second load 9b. As described above, the magnetization polarities of the two magnetic pole teeth 70e and 70f of the levitation armature 9b and the magnetization polarities of the upper surface and lower surface of the permanent magnet 2b facing the magnetic pole teeth 70e and 70f are the same; therefore, the position of the mover 6 in the up-down direction can be controlled by controlling the output to the levitation armature 9b. That is, when the mover 6 is displaced in the upper direction, the magnetic pole teeth 70e and 70f and the permanent magnet 2b can be caused to face each other with different polarities or an output current to the magnetic pole teeth 70e and 70f can be stopped.

For example, when a current is caused to flow into the two magnetic pole teeth 70e and 70f of the levitation armature 9b such that the two magnetic pole teeth 70e and 70f have the same polarity as the permanent magnet 2 that the two magnetic pole teeth 70e and 70f face, a repulsive force is generated between the mover 6 and the levitation armature 9b. In this case, passive control is possible; therefore, this case is preferred when there is a restriction on the control cycle of the positive-negative variable DC voltage of the second line voltage.

On the other hand, when a current is caused to flow into the two magnetic pole teeth 70e and 70f of the levitation armature 9b such that the two magnetic pole teeth 70e and 70f have a polarity different from the permanent magnet that the two magnetic pole teeth 70e and 70f face, an attractive force is generated between the mover 6 and the levitation armature 9b. In this case, a levitation force can be controlled more aggressively; therefore, this case is preferred when, for example, it is desired to control the position of the mover 6 in the up-down direction according to the position of the mover 6 in the front-rear direction also in consideration of characteristics of an external load connected to the linear motor 104, or when the average value of the external force applied to the mover 6 in the up-down direction is small.

These types of control can be performed by controlling the line voltages similarly to the control described with reference to FIGS. 10 and 11.

Arrangement of Armatures 9

Figure 19:
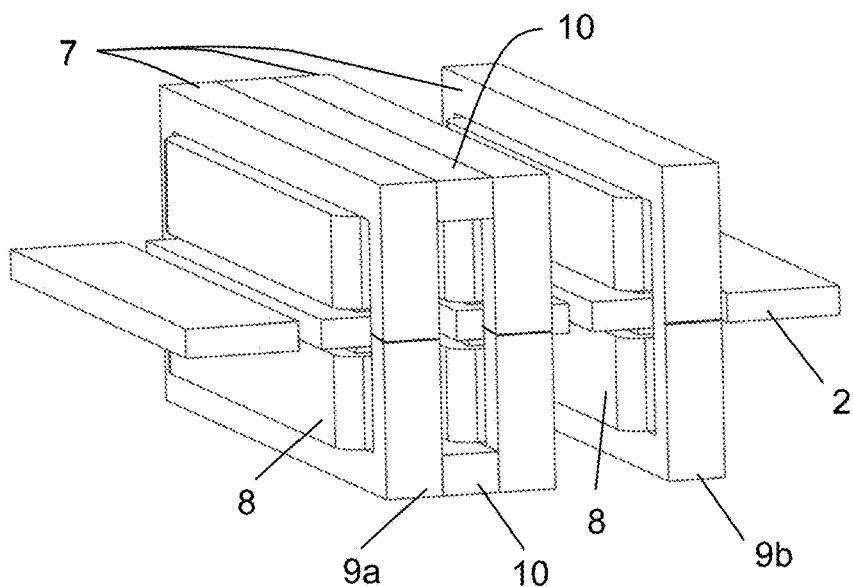
FIG. 19 A perspective view of the drive armature and a magnetic levitation armature according to Embodiment 1.
Figure 20:
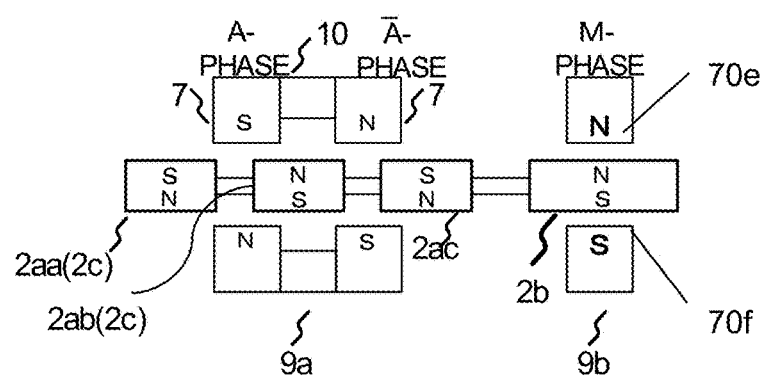
FIG. 20 A side schematic view of the drive armature and the magnetic levitation armature according to Embodiment 1.

FIG. 19 is a diagram showing an example of the arrangement of the drive armature 9a and the magnetic levitation armature 9b. FIG. 20 is a schematic view in a side view of FIG. 19. In the linear motor 104 according to the embodiment, the drive armature 9a and the levitation armature 9b are disposed to be arranged in the front-rear direction. The mover 6 is located in an air gap between the set of magnetic pole teeth of each of the drive armature 9a and the levitation armature 9b.

It is possible to provide thrust to the mover 6 by applying an alternating current having a frequency component, such as a sinusoidal alternating current, to the drive armature 9a using a publicly known synchronous-motor technique.

Moreover, it is possible to provide a magnetic levitation force to the mover 6 by applying a positive-negative variable direct current or constant current to the levitation armature 9b.

Compensation and Control of Eccentricity or Inclination of Mover 6

FIG. 21 are elevation views of the levitation armature 9b and the mover 6. As shown in FIG. 21(*a*), when the mover 6 is displaced upward, the distance between the permanent magnet 2b and the upper-side magnetic pole tooth 70a is shortened; therefore, a repulsive force caused by the upper surface (N-pole) of the permanent magnet 2b and the magnetism (N-pole) occurring in the upper-side magnetic pole tooth 70a is larger than a repulsive force caused by the lower surface (S-pole) of the permanent magnet 2b and the magnetism (S-pole) occurring in the lower-side magnetic pole tooth 70b. Therefore, the mover 6 moves in the lower direction. Conversely, when the mover 6 is displaced downward as shown in FIG. 21(*b*), the mover 6 moves in the upper direction in the same manner. As a result of this, the mover 6 is held at a substantially middle position that is magnetically balanced. That is, the mover 6 levitates magnetically and can be axially supported magnetically. Due to this, friction loss can be reduced, and the linear motor 104 can be driven with high efficiency.

Moreover, as shown in FIG. 21(*c*), the mover 6 may be inclined with respect to the left-right direction. At this time, there is a difference between repulsive forces at the ends of the inclined permanent magnet 2 in the left-right direction. As a result of this, a force is applied in the counterclockwise direction to the mover 6, and the mover 6 is horizontally held finally. That is, the inclination of the mover 6 with respect to the left-right direction can be controlled and compensated for by controlling the output to the levitation armature 9b. The permanent magnet 2 has a flat-plate shape having a width in the left-right direction, and it is preferable that an air-gap length in the up-down direction between the set of magnetic pole teeth is shorter than the length of the permanent magnet 2 in the left-right direction.

When the permanent magnet 2 has an annular shape, it is difficult to compensate for and control the inclination of the mover 6 with respect to the left-right direction. In the configurations of PTLs 1 and 2 described above, a configuration to compensate for and control the inclination of a control object using the shape of a permanent magnet is not disclosed.

By providing a plurality of magnetic levitation armatures 9b in the front-rear direction, the inclination of the mover 6 with respect to the front-rear direction can be compensated for and controlled.

Other Applications of Power Conversion Circuit 105

An object to which the power conversion circuit 105 applies an AC voltage and a positive-negative variable DC voltage (or an alternating current and a positive-negative variable direct current) is not limited to the linear motor 104. In the case of the linear motor 104, thrust and a magnetic levitation force of the mover 6 can be independently controlled as described above. In the case of a rotary motor, for example, a turning force and a magnetic levitation force can be independently controlled. The power conversion circuit 105 can be used in other various applications, in which position control or the like of a control object in two directions can be performed using the six switching elements.

Embodiment 2

A power conversion circuit 105 according to Embodiment 2 of the invention will be described. The configuration of Embodiment 2 can be similar to that of Embodiment 1 except for the following points.

Figure 22:
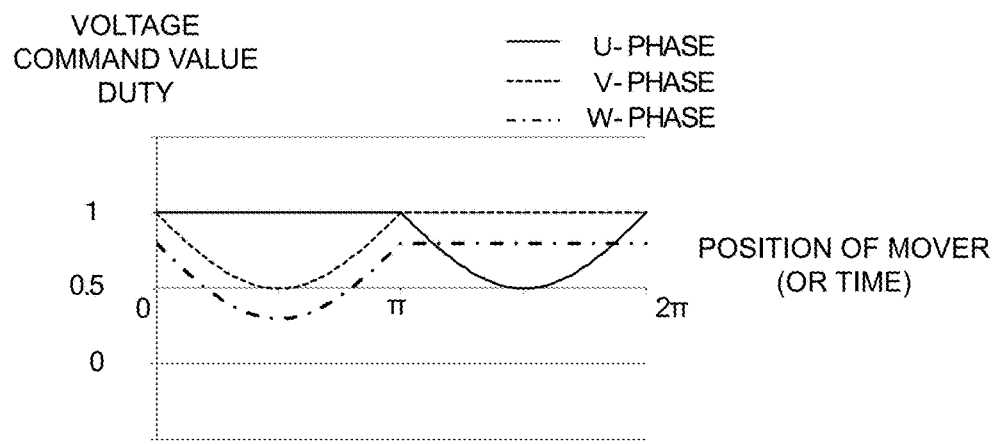
FIG. 22 A diagram showing voltage command values of a power conversion circuit according to Embodiment 2.

FIG. 22 is a diagram showing the voltage command values of the power conversion circuit 105. As shown in FIG. 22, in a section from 0 to π, the duty of the U-phase is 1 (i.e., the upper arm of the U-phase is held in the on state), and the V-phase has a downwardly-projected sinusoidal shape. In a section from π to 2π, the duty of the V-phase is 1 (i.e., the upper arm of the V-phase is held in the on state), and the U-phase has a downwardly-projected sinusoidal shape. The W-phase has a waveform obtained by adding an offset to the V-phase.

That is, in the three phases, the first phase has a duty ratio of 1 while the second phase and the third phase have duty ratios of sinusoidal shapes that are different by the offset from each other, over a half-cycle of reciprocating motion of the linear motor 104.

Figure 23:
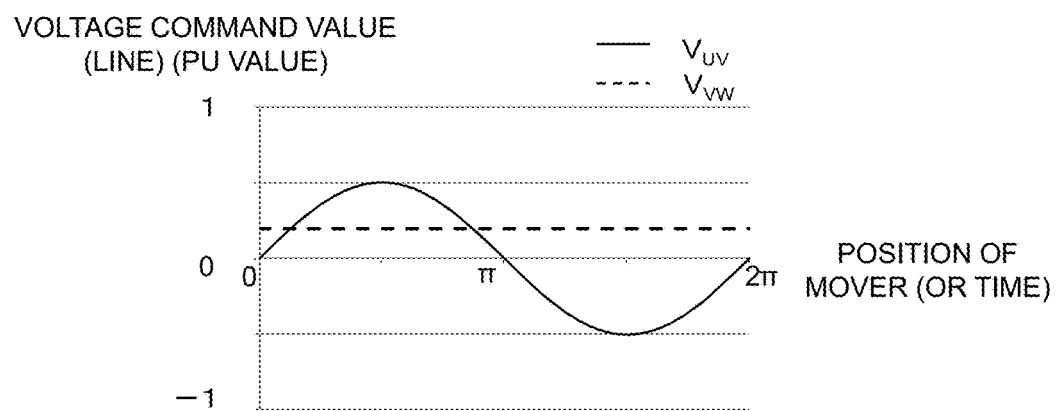
FIG. 23 A diagram showing line voltages of the power conversion circuit according to Embodiment 2.

FIG. 23 is a diagram showing the voltage command values of the UVW-phases shown in FIG. 22 as the two line voltages ($V_{UV}$, $V_{VW}$). As shown in FIG. 23, when considered as the line voltages, one sinusoidal AC voltage and one positive-negative variable DC voltage are output from one three-phase power conversion circuit.

When the duty is controlled so as to be kept at 0 or 1 as in the embodiment, switching loss can be suppressed. Hence, it is possible to suppress power consumption while providing advantageous effects similar to those of Embodiment 1.

Embodiment 3

A power conversion circuit 105 according to Embodiment 3 of the invention will be described. The configuration of Embodiment 3 can be similar to that of Embodiment 1 or 2 except for the following points.

Figure 24:
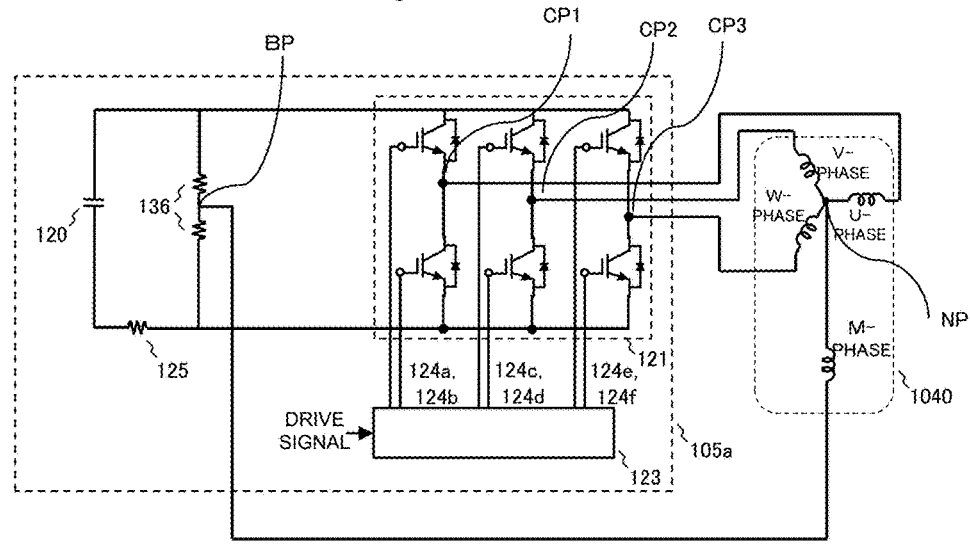
FIG. 24 A diagram showing the connection relationship among three drive armatures and a levitation armature of a linear motor and a power conversion circuit according to Embodiment 3.

FIG. 24 is a diagram showing the connection relationship among three drive armatures 9a and a levitation armature 9b of a linear motor 1040 and the power conversion circuit 105 according to the embodiment. In the drawing, the drive armatures 9a are respectively represented by coils (windings of the U-, V-, and W-phases), and the levitation armature 9b is represented by a coil (winding of the M phase).

Three drive armatures 9aa to 9ac are respectively connected on one sides to the up-down arms corresponding to the UVW-phases of the power conversion circuit 105. The levitation armature (M phase) is connected to a neutral point NP to which the other sides of the respective windings of the drive armatures 9aa to 9ac are connected, and to a neutral point BP due to voltage dividing resistors 136 added to the DC voltage source 120 side of the power conversion circuit 105.

Figure 25A:
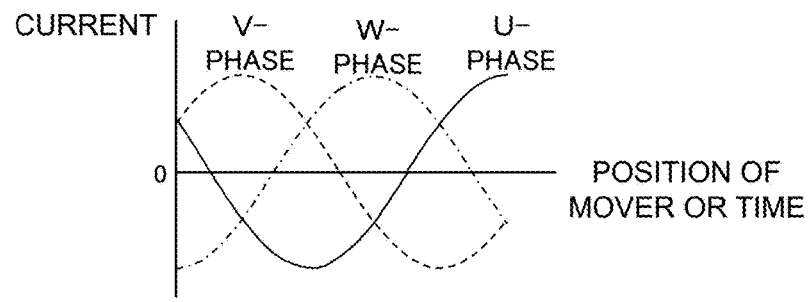
FIG. 25A A diagram showing a symmetrical three-phase alternating current flowing into each of the three drive armatures.
Figure 25B:
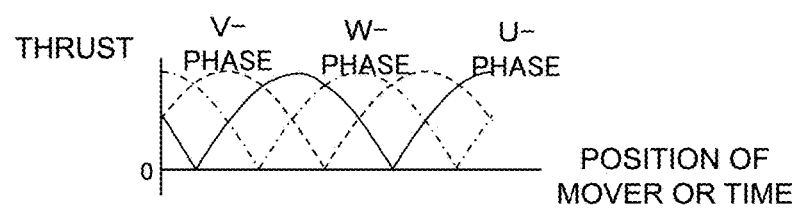
FIG. 25B A diagram showing thrust that the mover receives through the drive armatures.

Since a symmetrical three-phase alternating current shown in FIG. 25(*a*) is applied to the drive armatures 9aa to 9ac, a voltage at the neutral point NP is constant. Moreover, the drive armatures 9aa to 9ac can apply thrust shown in FIG. 25(*b*) to the mover 6 through a symmetrical three-phase AC voltage.

The voltage dividing resistors 136 are set such that a voltage at the neutral point BP located between the voltage dividing resistors 136 is substantially equal to the voltage at the neutral point NP through the symmetrical three-phase AC voltage. Although the number of voltage dividing resistors 136 is two in FIG. 24, three or more resistors may be used as long as a neutral point is formed. Since a voltage applied to each resistor is reduced by providing a plurality of resistors to constitute the voltage dividing resistor 136, the power conversion circuit can be downsized by using a chip resistor.

In the control of an inverter, when the voltage of the DC voltage source 120 is Edc, it is often considered to output a voltage of ±Edc/2 by PWM control on the bases of the midpoint of the DC voltage source 120. That is, when a balanced three-phase voltage is output from the inverter 121, a neutral point potential of the linear motor 1040 is the midpoint of the DC voltage source 120. On the other hand, when the voltage command values of all phases are offset as in FIG. 12, the neutral point potential of the linear motor 1040 is different from the midpoint of the DC voltage source 120. That is, the neutral point potential of the linear motor 1040 can be freely increased or reduced with respect to the midpoint of the DC voltage source 120 by changing the offset of the voltage command values of all phases.

Figure 26:
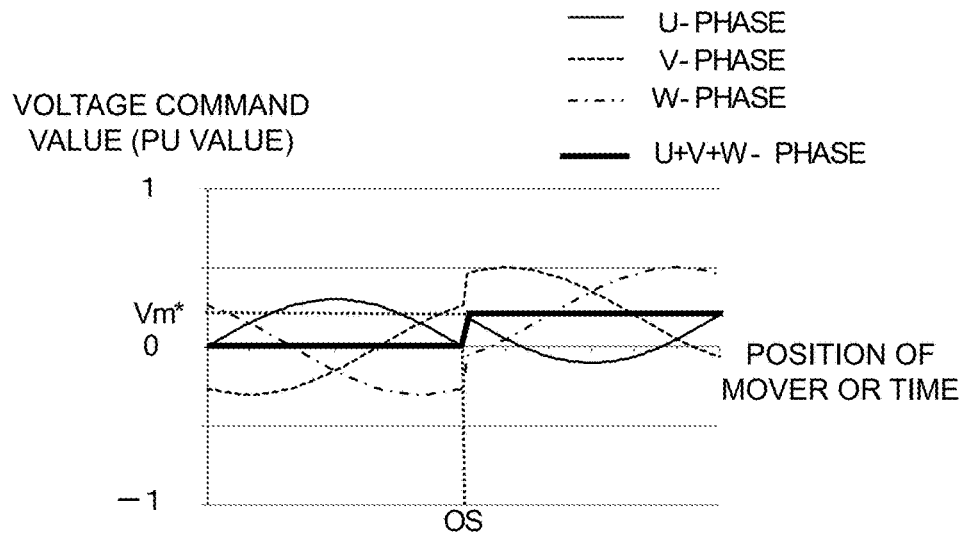
FIG. 26 A diagram showing voltage command values to the three drive armatures and a voltage value VU+V+W that the levitation armature receives, according to Embodiment 3.

Due to this, the output signal to the levitation armature (M phase) 9b can be controlled by adding an offset to the sum of symmetrical three-phase AC voltage applied to the drive armatures 9aa to 9ac. For example, a voltage $V_{U+V+W}$ can be applied to the levitation armature 9b as shown in FIG. 26 by adding an offset voltage command value to one, two, or three of the drive armatures 9aa to 9ac for a time during which a magnetic levitation force is required or at a mover position OS. In the embodiment, the same amount of offset is added to each of the voltage command values of all of the drive armatures 9aa to 9ac for the time or from the position OS.

Figure 27:
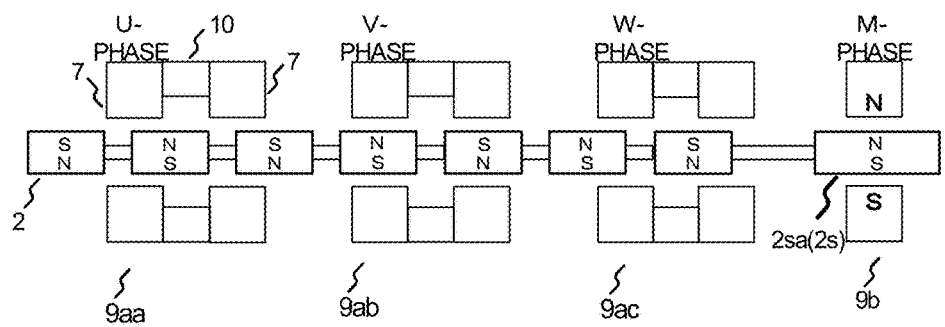
FIG. 27 A side schematic view showing the arrangement of the mover and the armatures according to Embodiment 3.

For the armatures 9, the levitation armature 9b can be disposed on one side of the drive armatures 9aa to 9ac as shown in, for example, FIG. 27. However, the levitation armature 9b is not limited to this and may be provided on both sides or between any two of the drive armatures 9aa to 9ac.

Voltage Command Value Generator 103a

Figure 28:
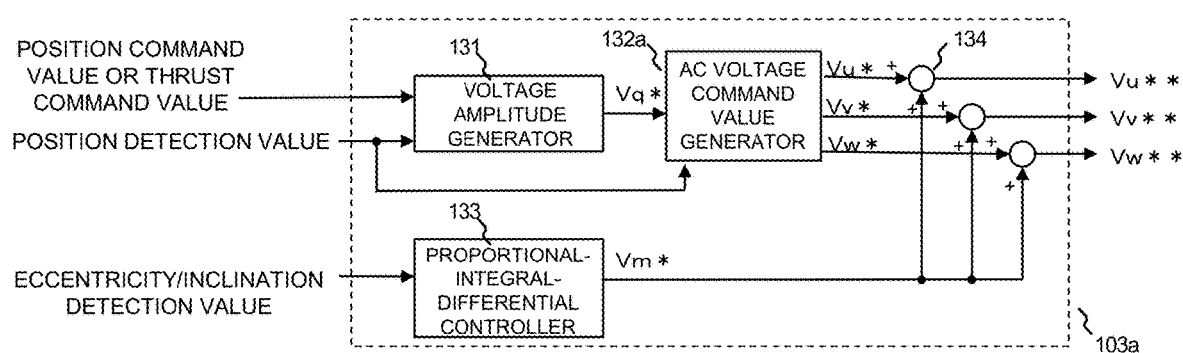
FIG. 28 A block diagram of a voltage command value generator according to Embodiment 3.

FIG. 28 is a block diagram of a voltage command value generator 103a according to the embodiment. In the AC voltage command value generator 132 according to the embodiment, sinusoidal voltage command values (Vu*, Vv*, Vw*) of three phases having a phase difference of 2π/3 are output according to the position θd of the mover as in Equation (3) to Equation (5).

[Math. 3]

$$Vu^* = Vq^* \times \sin \theta d \quad (3)$$

[Math. 4]

$$Vv^* = Vq^* \times \sin(\theta d + 2\pi/3) \quad (4)$$

[Math. 5]

$$Vw^* = Vq^* \times \sin(\theta d + 4\pi/3) \quad (5)$$

Resultants (Vu, Vv, Vw**) obtained by adding a magnetic levitation voltage command value Vm* output from a proportional-integral-differential controller 133 to the sinusoidal voltage command values (Vu*, Vv*, Vw*) of three phases are output.

According to the embodiment, even when the number of first loads (the drive armatures 9a) that receive a sinusoidal alternating current is three, a similar advantageous effect can be provided by using the symmetrical three-phase alternating current.

Embodiment 4

Next, a compressor equipped with the linear motor 104 or 1040 using the power conversion circuit 105 will be described.

Figure 29:
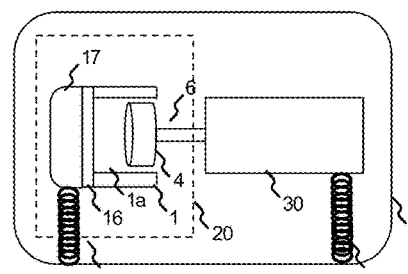
FIG. 29 A longitudinal cross-sectional view of a compressor according to Embodiment 4.

FIG. 29 is a longitudinal cross-sectional view of a hermetic compressor 50. The hermetic compressor 50 is a reciprocating compressor in which a compression element 20 and a motor element 30 are disposed in a hermetically sealed container 3. The compression element 20 and the motor element 30 are elastically supported by support springs 49 in the hermetically sealed container 3.

The compression element 20 includes a cylinder block 1 forming a cylinder 1a, a cylinder head 16 assembled at the end face of the cylinder block 1, and a head cover 17 forming a discharge chamber space. A working fluid supplied into the cylinder 1a is compressed by reciprocating motion of a piston 4, and the compressed working fluid is sent to a discharge pipe in communication with the outside of the compressor.

Figure 30:
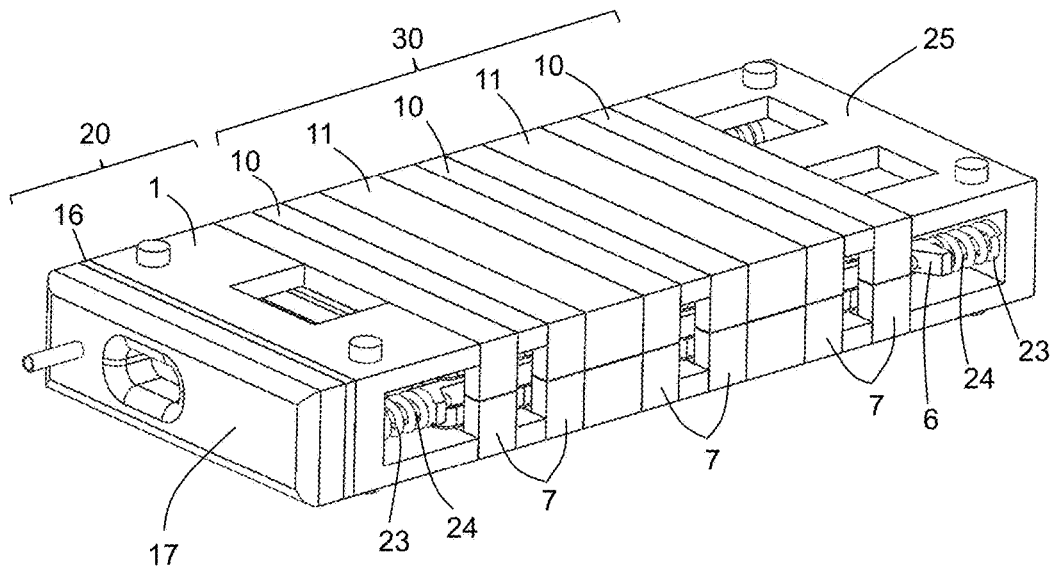
FIG. 30 A perspective view of the compressor according to Embodiment 4 with a hermetically sealed container 3 removed.
Figure 31:
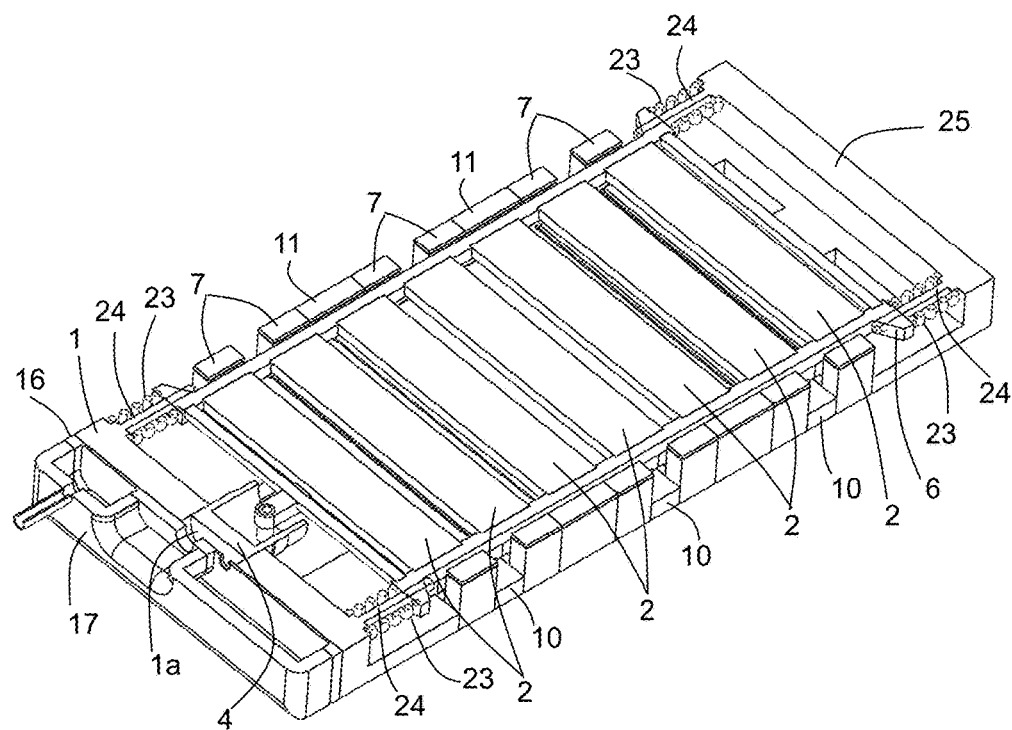
FIG. 31 A horizontal cross-section perspective view with the hermetically sealed container removed, according to Embodiment 4.

FIG. 30 is a perspective view of the hermetic compressor 50 with the hermetically sealed container 3 removed, and FIG. 31 is a horizontal cross-section perspective view of the hermetic compressor 50 with the hermetically sealed container 3 removed.

The embodiment employs a structure in which the piston 4 is coupled to one end of the mover 6 of the motor element 30. Therefore, a structure in which one cylinder 1a is disposed in the cylinder block 1 is employed.

Although the number of levitation armatures 9b or the position thereof is not particularly limited, the levitation armature 9b according to the embodiment is located on the other end side of the mover 6. The mover 6 can be effectively supported by the piston 4 and a magnetic levitation force by providing the piston 4 and the levitation armature 9b on opposite sides with respect to the center of gravity of the mover 6 in the front-rear direction.

Moreover, the compression element 20 is disposed on one end side of the motor element 30 while an end frame 25 is disposed on the other end side. The cylinder block 1 and the end frame 25 include guide rods 24 to constitute a structure for preventing the mover 6 from contacting the magnetic pole 7.

That is, the mover 6 performs reciprocating motion along the guide rod 24, and the guide rod 24 prevents the mover 6 from moving in a direction orthogonal to the direction of reciprocating motion.

By applying the linear motor described above to the motor element 30 according to the embodiment, the armature and the mover are held at the position (substantially middle position) magnetically balanced in the up-down direction, and at the same time, the inclination about the front-rear direction as an axis is also held at the position (substantially parallel) magnetically balanced.

Therefore, it is possible to reduce friction loss occurring in the cylinder 1a or the guide rod 24. Moreover, the guide rod 24 may be omitted.

Thus, according to the embodiment, a hermetic compressor with high reliability and high efficiency can be configured.

Embodiment 5

Figure 32:
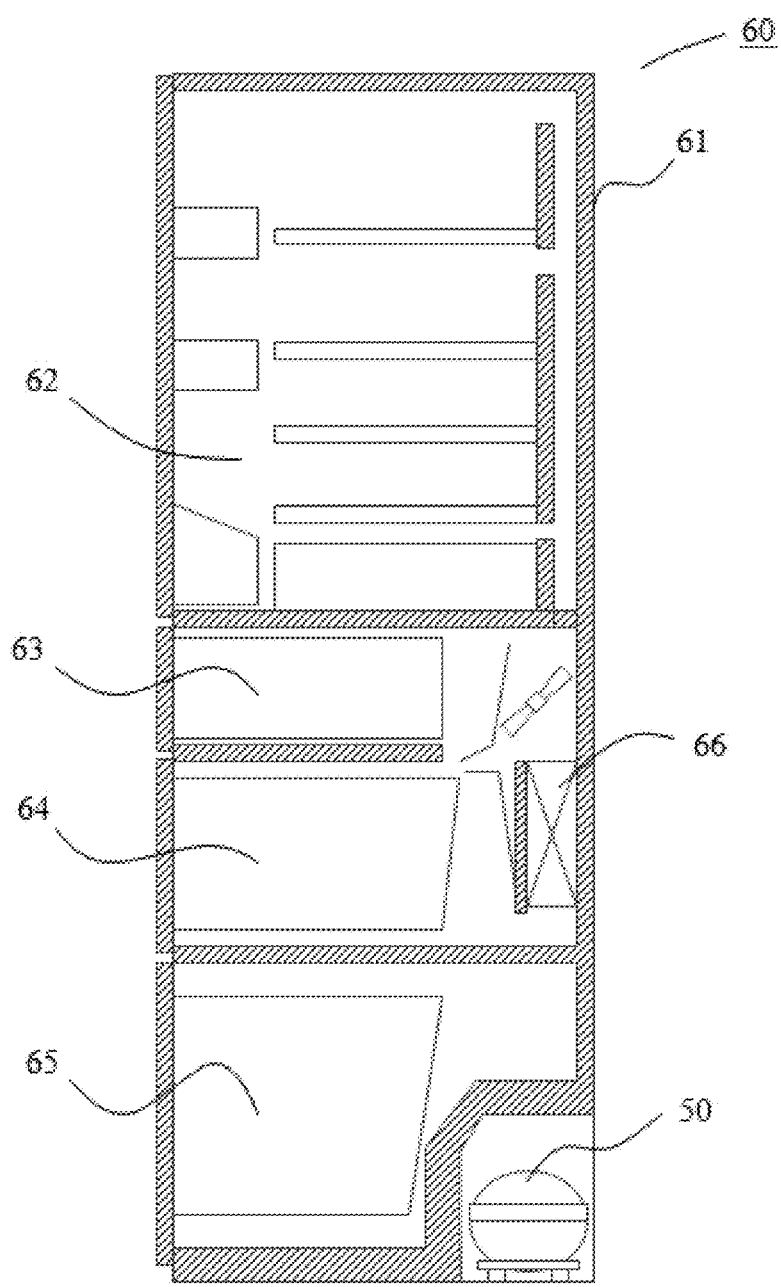
FIG. 32 A longitudinal cross-sectional view of a refrigerator according to Embodiment 5, as an example of an apparatus including a compressor equipped with a linear motor.

FIG. 32 is a longitudinal cross-sectional view of a refrigerator 60 as an example of an apparatus equipped with the compressor including the linear motor 104 or 1040. The hermetic compressor 50 is mounted in a refrigerator 60 including a cooler 66 and using, for example, a natural refrigerant R600a having a low global warming potential. A space in the refrigerator, which includes a refrigerator compartment 62, an upper freezer compartment 63, a lower freezer compartment 64, and a vegetable compartment 65, is cooled by operating a refrigeration cycle (not shown) through driving of the hermetic compressor 50.

Others

The power conversion circuit of the invention is not limited to applications for outputting a signal (voltage or current) to control the mover of the linear motor described above, is not limited to various motor systems, such as a motor system including a rotor of a rotary motor or a rotary motor, and motors, but can be used in applications for controlling two parameters of a control object.

The symmetrical three-phase alternating current used in the above is preferably used in a balanced three-phase AC circuit in which respective loads are equal to each other.

The invention is not limited to the embodiments described above but includes various modified examples. For example, the embodiments described above have been described in detail for clarity of description of the invention, and the invention is not necessarily limited to one including all of the configurations described. Moreover, a portion of the configurations of a certain embodiment can be replaced by the configuration of another embodiment, and the configuration of another embodiment can be added to the configuration of a certain embodiment. Moreover, the addition, deletion, and replacement of another configuration can be made to a portion of the configurations of each embodiment.

Moreover, a portion or all of the configurations, functions, processing units, processing procedures, and the like described above may be realized by hardware such as, for example, by designing an integrated circuit. Moreover, the configurations, functions, and the like described above may be realized by software such that a processor interprets and executes programs for realizing the functions.

Other Technical Ideas of Invention

The invention contains the following technical ideas.

Idea 1

A power conversion device including first, second, and third up-down arms each including two switching elements connected in series, wherein the power conversion device outputs a sinusoidal AC signal or rectangular-wave AC signal to a first load, and outputs a positive-negative variable DC signal or constant signal to a second load.

According to Idea 1, it is possible to provide the power conversion device that can output the AC signal and the positive-negative variable DC signal or DC signal while suppressing the number of switching elements used.

Idea 2

A motor system including the power conversion device according to Idea 1 and a control object that can be controlled through outputs to the first load and the second load of the power conversion device, wherein a force with respect to a first direction is provided to the control object through the output to the first load, and a force with respect to a second direction is provided to the control object through the output to the second load.

According to Idea 2, it is possible to provide the motor system that can apply a driving force and a force for attitude control to the control object while suppressing the number of switching elements used.

DESCRIPTION OF REFERENCE NUMERALS AND SIGNS

1 . . . cylinder block, 1a . . . cylinder, 2 . . . permanent magnet, 3 . . . hermetically sealed container, 4 . . . piston, 5 . . . stator, 6 . . . mover (control object), 6a . . . permanent magnet, 6b . . . mover frame, 7 . . . magnetic pole, 7e . . . core connecting magnetic pole teeth, 8 . . . winding, 9a . . . drive armature (first load), 9b . . . levitation armature (second load), 10 . . . bridge, 11 . . . spacer, 16 . . . cylinder head, 17 . . . head cover, 20 . . . compression element, 22 . . . top packing, 23 . . . resonance spring, 24 . . . guide rod, 25 . . . end frame, 30 . . . motor element, 40 . . . discharge valve device, 49 . . . support spring, 50 . . . hermetic compressor, 70 . . . magnetic pole tooth, 100 . . . linear motor system, 101 . . . power conversion device, 102 . . . control unit, 103 . . . control unit, 104 . . . linear motor, 105 . . . power conversion circuit, 120 . . . DC voltage source, 122 . . . switching element, 123 . . . gate driver circuit, 124 . . . drive signal, 131 . . . voltage amplitude generation unit, 132 . . . AC voltage command value generation unit, 135 . . . eccentricity/inclination detection unit, 136 . . . voltage dividing resistor.

The invention claimed is:

1. A motor system comprising:
   a power conversion device including first, second, and third up-down arms each including two switching elements connected in series;
   a control object; and
   a first load including a magnetic pole tooth facing the control object, and a winding wound around the magnetic pole tooth, wherein
   the motor system includes a second load including two magnetic pole teeth facing each other in a second direction with the control object therebetween, and a winding wound around one or both of the magnetic pole teeth, and
   the power conversion device
      provides a force with respect to a first direction to the control object through an output to the first load, and
      provides a force with respect to the second direction to the control object through an output to the second load; and
   wherein
   the power conversion device
      connects the first up-down arm and the second up-down arm to the first load,
      connects the second up-down arm and the third up-down arm to the second load,
      outputs a sinusoidal AC signal or rectangular-wave AC signal to the first load, and
      outputs a positive-negative variable DC signal or constant signal to the second load.

2. The motor system according to claim 1, further comprising a DC voltage source and a voltage dividing resistor connected in parallel to the DC voltage source, wherein the motor system includes three first loads,
respective one end sides of the three first loads are respectively connected to the three up-down arms,
the respective other end sides of the three first loads are connected to each other to form a neutral point,
the power conversion device outputs a symmetrical three-phase AC signal to the three first loads,
one end side of the second load is connected to the neutral point, and
the other end side of the second load is connected between two resistors belonging to the voltage dividing resistor.

3. The motor system according to claim 1, further comprising:
- a position detection unit that detects or estimates a position of the control object with respect to the first direction;
- an eccentricity/inclination detection unit that detects or estimates a position or inclination of the control object with respect to the second direction; and
- a control unit that changes an amplitude, frequency, or offset of output signals to the first load and the second load according to outputs of the position detection unit and the eccentricity/inclination detection unit.

4. The motor system according to claim 1, wherein
the first load and the second load are arranged in the first direction,
the control object includes a permanent magnet capable of facing the first load and a permanent magnet capable of facing the second load, and
the permanent magnet capable of facing the second load has a flat-plate shape having a width in a third direction.

5. A compressor comprising:
the motor system according to claim 1;
a piston provided on one end side of the control object and capable of performing reciprocating motion in the first direction; and
a cylinder on which the piston slides, wherein
the second load is provided on the other end side of the control object.

* * * * *